US006448947B1

(12) United States Patent
Nagai

(10) Patent No.: US 6,448,947 B1
(45) Date of Patent: Sep. 10, 2002

(54) METHOD OF DRIVING PLASMA DISPLAY PANEL AND PLASMA DISPLAY DEVICE

(75) Inventor: Takayoshi Nagai, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/493,665

(22) Filed: Jan. 28, 2000

(30) Foreign Application Priority Data

Jan. 29, 1999 (JP) .......................................... 11-022469

(51) Int. Cl.[7] ................................................ G05B 11/32
(52) U.S. Cl. ............................................ 345/60; 345/68
(58) Field of Search ............................. 345/66, 63, 67, 345/68, 103; 315/169.4

(56) References Cited

U.S. PATENT DOCUMENTS 6,084,558 A * 7/2000 Setoguchi et al. ............ 345/60
6,172,465 B1 * 1/2001 Huang ..................... 315/169.3
6,252,574 B1 * 6/2001 Hosoi et al. ................ 345/103

FOREIGN PATENT DOCUMENTS

JP 5216434 8/1993
JP 643829 2/1994
JP 764508 3/1995
JP 7160218 6/1995
JP 7319424 12/1995
JP 2801893 7/1998

* cited by examiner

*Primary Examiner*—Vijay Shankar
*Assistant Examiner*—Nitin Patel

(57) ABSTRACT

Sustain electrodes X1 to Xn and X2*n*+1 to X3*n* are connected to a first common driver 4XA, and sustain electrodes Xn+1 to X2*n* and X3*n*+1 to X4*n* are connected to a second X common driver 4XB. Scan electrodes Y1 to Y2*n* are connected to a first Y common driver 3Y*a* through a first scan driver 2Y*a* having each output terminal connected with each of these electrodes, and scan electrodes Y2*n*+1 to Y4*n* are connected to a second Y common driver 3Y*b* through a second scan driver 2Y*b* having each output terminal connected with each of these electrodes. Voltages are sequentially supplied to four blocks BLAa, BLAb, BLBa and BLBb divided as matrix combination of the first or second X common driver 4XA or 4XB and the first or second common driver 3Y*a* or 3Y*b* at staggered timing. Thus, reduction of a peak current in discharge, miniaturization of the common drivers, cost reduction and reduction of power consumption are attained.

17 Claims, 19 Drawing Sheets

F/G. 7

METHOD OF DRIVING PLASMA DISPLAY PANEL AND PLASMA DISPLAY DEVICE

BACKGROUND OF THE INVENTION

1. Field of the Invention

The present invention relates to a method of driving a plasma display panel (hereinafter also referred to as "PDP") and a plasma display device, and more particularly, it relates to a technique of reducing the scale of a common driver, reducing the cost and saving power.

2. Description of the Background Art

FIG. 22 is a block diagram typically showing the overall structure of a conventional plasma display device as first prior art. This structure is disclosed in Japanese Patent Laying-Open Gazette No. 7-160218 (1995) (Japanese Patent No. 2772753), for example. As shown in FIG. 22, a control circuit 106 generates prescribed control signals on the basis of an input clock signal CLK, image data DATA, a vertical synchronizing signal VSYNC and a horizontal synchronizing signal HSYNC and outputs the control signals to an address driver 105, a Y common driver 102, a scan driver 103 and an X common driver 104. The circuits 102, 103, 104, 105 and 106 are supplied with prescribed voltages generated in a power supply circuit 107.

The X common driver 104 and the address driver 105 generate prescribed voltages on the basis of the control signals from the control circuit 106 respectively, and output the voltages to sustain electrodes X1 to XN and address electrodes A1 to AM of three electrode plane discharge alternating plasma display panel (AC-PDP) 101 connected to output terminals of the respective drivers. The N sustain electrodes X1 to XN are connected in common (therefore, these electrodes are also generically referred to as "sustain electrodes X") and subjected to application of the same voltage. The Y common driver 102 generates a prescribed voltage on the basis of the control signal from the control circuit 106 and supplies the voltage to scan electrodes Y1 to YN through the scan driver 103 for the PDP 101.

FIG. 23 is a longitudinal sectional view of the PDP 101 disclosed in the aforementioned gazette. This figure illustrates the structure of a discharge cell C formed on the (three-dimensional) intersection between each pair of electrodes formed by each sustain electrode and each scan electrode and each address electrode shown in FIG. 22.

As shown in FIG. 23, the PDP 101 has a front substrate 151 and a back substrate (or rear substrate) 161 arranged in parallel with each other through a discharge space 160. A strip-shaped sustain electrode Xi (i: 1 to N) and a strip-shaped scan electrode Yi arranged in parallel with each other to define an electrode pair are formed on the surface of the front substrate 151 closer to the discharge space 160 along the direction perpendicular to the plane of FIG. 23. A dielectric or insulating layer 152 is formed to cover the aforementioned electrodes Xi and Yi and the aforementioned surface of the front substrate 151. A protective film 155 consisting of a high secondary electron emission material such as magnesium oxide (MgO) is formed on the surface of the dielectric layer 152 closer to the discharge space 160.

On the other hand, each strip-shaped address electrode Ak (k: 1 to M) is formed on the surface of the back substrate 161 closer to the discharge space 160 along the direction parallel to the plane of FIG. 23 (see FIGS. 22 and 23). A plurality of strip-shaped barrier ribs 163 are formed perpendicularly across the address electrode Ak, i.e., along the direction perpendicular to the plane of FIG. 23 (the barrier ribs 163 may alternatively be formed in parallel with the address electrode Ak along cell boundaries).

A fluorescent substance layer 164 is formed on a region of the aforementioned surface of the back substrate 161 (and on the address electrode Ak) having no barrier ribs 163 (the fluorescent substance layer 164 may also be formed on side wall surfaces of the barrier ribs 163). A dielectric or insulating layer may be formed on the surface of the fluorescent substance layer 164 closer to the back substrate 163 to cover the aforementioned surface of the back substrate 161 and the address electrode Ak.

A method of driving the AC-PDP disclosed in the aforementioned gazette is now described. FIG. 24 is a timing chart showing the waveforms of the voltages applied to the respective electrodes in this driving method in a period of one subfield in a subfield gradation method.

As shown in FIG. 24, one subfield is divided into (a) a reset period for erasing wall charges remaining as the display history in a preceding subfield, (b) an address period for applying wall charges based on image data to discharge cells for generating display emission forming image display in a sustain period described later, and (c) a sustain discharge period or the sustain period for generating sustain discharge in the discharge cells storing the wall charges in the address period and performing display emission.

In the reset period, a full write pulse 24 is applied to the sustain electrode Xi at a time ta for generating discharge in all discharge cells. The full write pulse 24 is also referred to as a priming pulse. At a time tb when the full write pulse 24 falls, self-erase discharge is generated to erase wall charges of all discharge cells. In the subsequent address period, a scan pulse 21 is sequentially applied to the scan electrodes Y1 to YN (at a time tc, for example) while an address pulse 22 based on the input image data DATA (see FIG. 22) is applied to the address electrodes A1 to AM. Thus, address discharge is generated in discharge cells to be turned on for display in the sustain period for storing wall charges in the discharge cells. In the subsequent sustain period, a sustain pulse 23 is alternately applied to the scan electrode Yi and the sustain electrode Xi (see times td and te). At this time, only the discharge cells storing wall charges due to the aforementioned address discharge cause sustain discharge performing image display immediately after the rise of the sustain pulse 23.

In the conventional driving method, the priming pulse 24 and the sustain pulse 23 are generated in the X common driver 104 and the Y common driver 102 and simultaneously applied to the full screen of the PDP. At this time, discharge simultaneously starts on the full screen or in all discharge cells, and hence the X common driver 104 and the Y common driver 102 supply an extremely large peak current to the PDP. The value of this peak current may reach 200 A in a PDP of 100 cm diagonal (type 40), for example. Therefore, circuits forming the common drivers 104 and 102 disadvantageously have remarkable power loss. Further, the X common driver 104 and the Y common driver 102 are required to have ability of supplying the current having the aforementioned large peak. Therefore, the X common driver 104 and the Y common driver 102 must be increased in circuit scale, to disadvantageously result in increase of the cost or the price of the common drivers 104 and 102 and the plasma display device.

Japanese Patent Laying-Open Gazette No. 7-64508 (1995) proposes an exemplary method capable of solving such problems. FIG. 25 is a model diagram showing the structure of a plasma display device proposed in this gazette as second prior art. As shown in FIG. 25, the plasma display device according to the second prior art divides sustain electrodes X1 to X2*n* and scan electrodes Y1 to Y2*n* into two blocks, i.e., a block 201*a* including the sustain electrodes X1 to Xn and the scan electrodes Y1 to Yn and a block 201*b* including the sustain electrodes Xn+1 to X2*n* and the scan electrodes Yn+1 to Y2*n*, and is provided with dedicated sustain drivers (corresponding to the common drivers in the aforementioned conventional plasma display device) 202*a*, 202*b*, 204A and 204B for the respective blocks 201*a* and 201*b*. Referring to FIG. 25, a PDP 201, an address driver 205 and scan drivers 203*a* and 203*b* correspond to the PDP 101, the address driver 105 and the scan driver 103 shown in FIG. 22 respectively. The aforementioned gazette according to the second prior art states that the aforementioned peak current can be reduced to half that in the aforementioned conventional plasma display device by staggering the timing for each discharge in the aforementioned two blocks 201*a* and 201*b*. According to the structure shown in FIG. 25 and the aforementioned driving method, it is possible to reduce the scale of a power supply device in the plasma display device since the peak value of the power supply current, i.e., the current flowing in the sustain drivers 202*a*, 202*b*, 204A and 204B can be reduced to half that in the common drivers 102 and 104 (see FIG. 22) of the conventional plasma display device. However, the peak current half that in the conventional plasma display device flows to each of the divided sustain drivers 202*a* and 202*b* or 204A and 204B, and hence the scale of the sustain drivers required for the overall plasma display device is (sustain driver of ½ in scale)×(two blocks). In other words, it can be said that the circuit scale of the overall sustain drivers in the plasma display device according to the second prior art is substantially identical to that of the conventional plasma display device.

FIG. 26 is a timing chart related to a method of driving a plasma display device disclosed in Japanese Patent Laying-Open Gazette No. 7-319424 (1995) as third prior art. In this driving method, scan electrodes Y1 to YN are divided into n blocks while pulse voltages out of phase with each other are applied to the respective blocks (see times tp2 to tp11), as shown in FIG. 26. The aforementioned gazette according to the third prior art states that the peak value of the discharge current can be reduced to 1/n. It is indeed conceivable that the scale of common drivers not divided into blocks can be reduced to 1/n. However, the scale of common drivers divided into blocks is substantially identical to that of the conventional plasma display device for a reason similar to that in the case of the second prior art.

In a plasma display device disclosed in Japanese Patent Laying-Open Gazette No. 6-43829 (1994) as fourth prior art, one frame period is divided into an odd field and an even field for performing driving every other row, as shown in FIG. 27. According to this field structure, it is conceivable that peak current suppliability of sustain drivers may be half that in the conventional plasma display device since the peak current in discharge can be reduced to half that in the conventional plasma display device and the sustain drivers are not divided. However, display emission or display lighting is performed every other row and hence the number of sustain pulses per unit time, i.e., a sustain frequency must be twice that in the conventional plasma display device in order to attain the same brightness as the conventional plasma display device. When the sustain frequency is doubled, however, reactive power generated when charging/discharging capacitance components between electrodes of the PDP is disadvantageously doubled as compared with the conventional plasma display device.

As hereinabove described, it is difficult to reduce the circuit scale of common drivers or sustain drivers in the plasma display device according to the second, third, or fourth prior art as compared with that in the conventional plasma display device. Although the circuit scale of the common drivers can be reduced in the plasma display device according to the fourth prior art, another problem arises such that reactive power increases.

SUMMARY OF THE INVENTION

A driving method according to a first aspect of the present invention is a method of driving a plasma display panel comprising a plurality of first electrodes arranged in parallel with each other and a plurality of second electrodes each pairing with each first electrode for forming prescribed discharge in a discharge space between each pair of electrodes formed by the first electrode and the second electrode while the plurality of pairs of electrodes are divided into (s×t) (s and t: integer of at least 2)) electrode pair groups with combination of the plurality of first electrodes divided into s first electrode groups and the plurality of second electrodes divided into t second electrode groups, and the prescribed discharge in the (s×t) electrode pair groups is generated in units of the electrode pair groups at staggered timing.

(1) According to the first aspect, the prescribed discharge is generated in the (s×t) electrode pair groups at staggered timing, whereby a peak current in the discharge can be reduced to 1/(s×t) as compared with the peak current in the conventional driving method simultaneously generating discharge in the overall pairs of electrodes or on the full screen of the plasma display panel. Therefore, the aforementioned peak current for all first electrodes can be reduced to 1/t that in the conventional driving method, and the aforementioned peak current for all second electrodes can be reduced to 1/s. Consequently, it is possible to reduce a substantial peak current flowing in each driver circuit connected to each of the first and second electrodes for supplying a prescribed driving voltage or voltage pulse to the electrodes, i.e., current suppliability of each driver circuit to 1/t or to 1/s as compared with the conventional driver circuit. Therefore, it is possible to provide a method of driving a plasma display panel capable of implementing miniaturization of each driver circuit, cost reduction and reduction of power consumption.

In a driving method according to a second aspect of the present invention which is the method of driving a plasma display panel according to the first aspect, the prescribed discharge in the (s×t) electrode pair groups is generated without simultaneously generating discharge in a plurality of first electrode groups among the s first electrode groups and without simultaneously generating discharge in a plurality of second electrode groups among the t second electrode groups.

(2) According to the second aspect, discharge of the plasma display panel is executed (i) so that no discharge is simultaneously generated in a plurality of first electrode groups among the s first electrode groups, (ii) without simultaneously generating discharge in a plurality of second electrode groups among the t second electrode groups. When simultaneously generating discharge in a plurality of electrode pair groups among the (s×t) electrode pair groups while satisfying the aforementioned conditions (i) and (ii), therefore, the time required for discharge executed on the overall surface of the plasma display panel, such as a time required for sustain discharge in a subfield gradation method (i.e., a sustain period), for example, can be reduced as compared with the driving method according to the first aspect, in addition to the aforementioned effect (1).

According to the second aspect, further, the number of voltage pulses applied to the first and second electrodes respectively for the discharge executed on the overall surface of the plasma display panel such as the aforementioned sustain discharge, for example, can be reduced as compared with that in the driving method according to the first aspect. Thus, reactive power can be further reduced when driving the plasma display panel. According to the second aspect of the present invention, therefore, it is possible to provide a plasma display device with smaller power consumption as compared with a plasma display device comprising the plasma display panel driven by the driving method according to the first aspect.

A driving method according to a third aspect of the present invention is the method of driving a plasma display panel according to the first or second aspect, and the plurality of first electrodes are divided into two first electrode groups and the plurality of second electrodes are divided into two second electrode groups, the plurality of electrode pair groups are divided into a first electrode pair group formed by one of the first electrode groups and one of the second electrode groups, a second electrode pair group formed by the one of the first electrode groups and the other of the second electrode groups, a third electrode pair group formed by the other of the first electrode groups and the one of the second electrode groups, and a fourth electrode pair group formed by the other of the first electrode groups and the other of the second electrode groups, while the method comprises steps of simultaneously generating the prescribed discharge in the first electrode pair group and the fourth electrode pair group, and simultaneously generating the prescribed discharge in the second electrode pair group and the third electrode pair group.

(3) According to the third aspect, an effect similar to the aforementioned effect (1) or (2) can be attained. When the first and second electrodes are arranged in parallel with each other to form display lines or scan lines of the plasma display panel and the first and fourth electrode pair groups are made to correspond to odd rows (or even rows) of the display lines in the plasma display panel while the second and third electrode pair groups are made to correspond to the even rows (or the odd rows) of the display lines, the prescribed discharge can be alternately generated in the odd-row and even-row display lines. Therefore, it is possible to provide a driving method optimum for an interlace signal for a TV image or the like.

A driving method according to a fourth aspect of the present invention is the method of driving a plasma display panel according to the third aspect, and the first electrodes and the second electrodes are arranged in parallel with each other, while either the one of the first electrode groups or the one of the second electrode groups forms one of electrodes in any odd or even pairs of electrodes among the plurality of pairs of electrodes arranged in parallel with each other.

(4) According to the fourth aspect, it is possible to implement image display optimum for an interlace signal for a TV image or the like while attaining an effect similar to the aforementioned effect (3), i.e., similar to the aforementioned effect (1) or (2) when the first and second electrodes are arranged in parallel with each other to form display lines or scan lines of the plasma display panel.

A driving method according to a fifth aspect of the present invention is the method of driving a plasma display panel according to the fourth aspect, and one frame period for image display is divided into a period generating discharge in the odd pairs of electrodes and a period generating discharge in the even pairs of electrodes.

(5) According to the fifth aspect, the duty ratio of a driving pulse supplied to each electrode can be arbitrarily set, whereby it is possible to improve the degree of freedom in the driving method for the prescribed discharge such as the aforementioned sustain discharge, for example, or the driving method in a sustain period.

A driving method according to a sixth aspect of the present invention is a method of driving a plasma display panel comprising a plurality of first electrodes arranged in parallel with each other and a plurality of second electrodes arranged in a direction three-dimensionally intersecting with the plurality of first electrodes through a discharge space for forming prescribed discharge in each discharge cell formed on each of the three-dimensional intersections, and the plurality of first electrodes are divided into two first electrode groups and the plurality of second electrodes are divided into two second electrode groups while a plurality of discharge cells are divided into a first discharge cell group formed on the three-dimensional intersection between one of the first electrode groups and one of the second electrode groups, a second discharge cell group formed on the three-dimensional intersection between the one of the first electrode groups and the other of the second electrode groups, a third discharge cell group formed on the three-dimensional intersection between the other of the first electrode groups and the one of the second electrode groups, and a fourth discharge cell group formed on the three-dimensional intersection between the other of the first electrode groups and the other of the second electrode groups, and the method comprises steps of simultaneously generating the prescribed discharge in the first discharge cell group and the fourth discharge cell group, and simultaneously generating the prescribed discharge in the second discharge cell group and the third discharge cell group.

(6) According to the sixth aspect, an effect similar to the aforementioned effect (1) or (2) can be attained also in a plasma display panel having first and second electrodes arranged in three-dimensionally intersecting directions through a discharge space with discharge cells formed on the three-dimensional intersections respectively, i.e., the so-called opposite two-electrode plasma display panel.

In a driving method according to a seventh aspect of the present invention, which is the method of driving a plasma display panel according to any of the first to fifth aspects, an image display time for one screen is divided into a plurality of subfields and then priming discharge, erase discharge, write discharge based on input image data and sustain discharge are generated in the discharge space in each of the plurality of subfields, and the prescribed discharge is at least one of the priming discharge, the erase discharge and the sustain discharge.

(7) According to the seventh aspect, prescribed discharge is discharge simultaneously generated for the overall surface of the plasma display panel in the conventional driving method in the so-called subfield gradation method. At least one of priming discharge, erase discharge and sustain discharge corresponds. Therefore, any of the aforementioned effects (1) to (6) can be attained.

In a driving method according to an eighth aspect of the present invention, which is the method of driving a plasma display panel according to the sixth aspect, an image display time for one screen is divided into a plurality of subfields and then priming discharge, erase discharge, write discharge based on input image data and sustain discharge are generated in the discharge space in each of the plurality of subfields, and the prescribed discharge is at least one of the priming discharge, the erase discharge and the sustain discharge.

(8) According to the eighth aspect, an effect similar to the aforementioned effect (7) can be attained.

The present invention is also directed to a plasma display device. A plasma display device according to a ninth aspect of the present invention comprises a plasma display panel including a plurality of first electrodes arranged in parallel with each other and a plurality of second electrodes each pairing with each first electrode for forming prescribed discharge in a discharge space between each pair of electrodes formed by the first electrode and the second electrode, and a driving device connected to the plurality of first electrodes and the plurality of second electrodes for supplying a driving voltage to each first electrode and each second electrode, while the plurality of pairs of electrodes are divided into (s×t (s and t: integer of at least 2)) electrode pair groups with combination of the plurality of first electrodes divided into s first electrode groups and the plurality of second electrodes divided into t second electrode groups, and the driving device generates and outputs the driving voltage generating each prescribed discharge in each of the (s×t) electrode pair groups in units of the electrode pair groups at staggered timing.

(9) According to the ninth aspect, it is possible to provide a plasma display device attaining an effect similar to the aforementioned effect (1).

A plasma display device according to a tenth aspect of the present invention is the plasma display device according to the ninth aspect, and the driving unit generates and outputs the driving voltage generating the prescribed discharge in each of the (s×t) electrode pair groups without simultaneously generating discharge in a plurality of first electrode groups among the s first electrode groups and without simultaneously generating discharge in a plurality of second electrode groups among the t second electrode groups.

(10) According to the tenth aspect, it is possible to provide a plasma display device attaining an effect similar to the aforementioned effect (2).

A plasma display device according to an eleventh aspect of the present invention is the plasma display device according to the ninth or tenth aspect, and the plurality of first electrodes are divided into two first electrode groups and the plurality of second electrodes are divided into two second electrode groups, while the plurality of electrode pair groups are divided into a first electrode pair group formed by one of the first electrode groups and one of the second electrode groups, a second electrode pair group formed by the one of the first electrode groups and the other of the second electrode groups, a third electrode pair group formed by the other of the first electrode groups and the one of the second electrode groups, and a fourth electrode pair group formed by the other of the first electrode groups and the other of the second electrode groups, and the driving device generates and outputs the driving voltage simultaneously generating the prescribed discharge in the first electrode pair group and the fourth electrode pair group, and generates and outputs the driving voltage simultaneously generating the prescribed discharge in the second electrode pair group and the third electrode pair group.

(11) According to the eleventh aspect, it is possible to provide a plasma display device attaining an effect similar to the aforementioned effect (3).

A plasma display device according to a twelfth aspect of the present invention is the plasma display device according to the eleventh aspect, and the first electrodes and the second electrodes are arranged in parallel with each other, while either the one of the first electrode groups or the one of the second electrode groups forms one of electrodes in any odd or even pairs of electrodes among the plurality of pairs of electrodes arranged in parallel with each other.

(12) According to the twelfth aspect, it is possible to provide a plasma display device attaining an effect similar to the aforementioned effect (4).

A plasma display device according to a thirteenth aspect of the present invention is the plasma display device according to the twelfth aspect, and the driving device divides one frame period for image display into a period generating discharge in the odd pairs of electrodes and a period generating discharge in the even pairs of electrodes and then generates and outputs the driving voltage.

(13) According to the thirteenth aspect, it is possible to provide a plasma display device attaining an effect similar to the aforementioned effect (5).

A plasma display device according to a fourteenth aspect of the present invention comprises a plasma display panel including a plurality of first electrodes arranged in parallel with each other and a plurality of second electrodes arranged in a direction three-dimensionally intersecting with the plurality of first electrodes through a discharge space for forming prescribed discharge in each discharge cell formed on each of the three-dimensional intersections, and a driving device connected to the plurality of first electrodes and the plurality of second electrodes for supplying a driving voltage to each first electrode and each second electrode, while the plurality of first electrodes are divided into two first electrode groups and the plurality of second electrodes are divided into two second electrode groups, a plurality of discharge cells are divided into a first discharge cell group formed on the three-dimensional intersection between one of the first electrode groups and one of the second electrode groups, a second discharge cell group formed on the three-dimensional intersection between the one of the first electrode groups and the other of the second electrode groups, a third discharge cell group formed on the three-dimensional intersection between the other of the first electrode groups and the one of the second electrode groups, and a fourth discharge cell group formed on the three-dimensional intersection between the other of the first electrode groups and the other of the second electrode groups, and the driving device generates and outputs the driving voltage simultaneously generating the prescribed discharge in the first discharge cell group and the fourth discharge cell group, and generates and outputs the driving voltage simultaneously generating the prescribed discharge in the second discharge cell group and the third discharge cell group.

(14) According to the fourteenth aspect, it is possible to provide a plasma display device attaining an effect similar to the aforementioned effect (6).

A plasma display device according to a fifteenth aspect of the present invention is the plasma display device according to any of the ninth to thirteenth aspects, and when the driving device divides an image display time for one screen into a plurality of subfields and then generates and outputs the driving voltage for generating priming discharge, erase discharge, write discharge based on input image data and sustain discharge in the discharge space in each of the plurality of subfields, the prescribed discharge is at least one of the priming discharge, the erase discharge and the sustain discharge.

(15) According to the fifteenth aspect, it is possible to provide a plasma display device attaining an effect similar to the aforementioned effect (7).

A plasma display device according to a sixteenth aspect of the present invention is the plasma display device according to the fourteenth aspect, and when the driving device divides an image display time for one screen into a plurality of subfields and then generates and outputs the driving voltage for generating priming discharge, erase discharge, write discharge based on input image data and sustain discharge in the discharge space in each of the plurality of subfields, the prescribed discharge is at least one of the priming discharge, the erase discharge and the sustain discharge.

(16) According to the sixteenth aspect, it is possible to provide a plasma display device attaining an effect similar to the aforementioned effect (8).

A first object of the present invention is to provide a method of driving a plasma display panel capable of reducing a peak current in discharge as compared with the conventional plasma display device.

A second object of the present invention is to provide a method of driving a plasma display panel capable of implementing miniaturization of a driver circuit supplying a voltage to each electrode, cost reduction and reduction of power consumption while attaining the aforementioned first object.

A third object of the present invention is to provide a method of driving a plasma display panel optimum for an interlace signal while attaining the aforementioned first and second objects.

A fourth object of the present invention is to provide a plasma display device facilitated in miniaturization, cost reduction and reduction of power consumption as compared with the conventional plasma display device by comprising a plasma display panel driven by a driving method capable of attaining the aforementioned first to third objects.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

First Embodiment (Overall Structure of Plasma Display Device)

Figure 1:
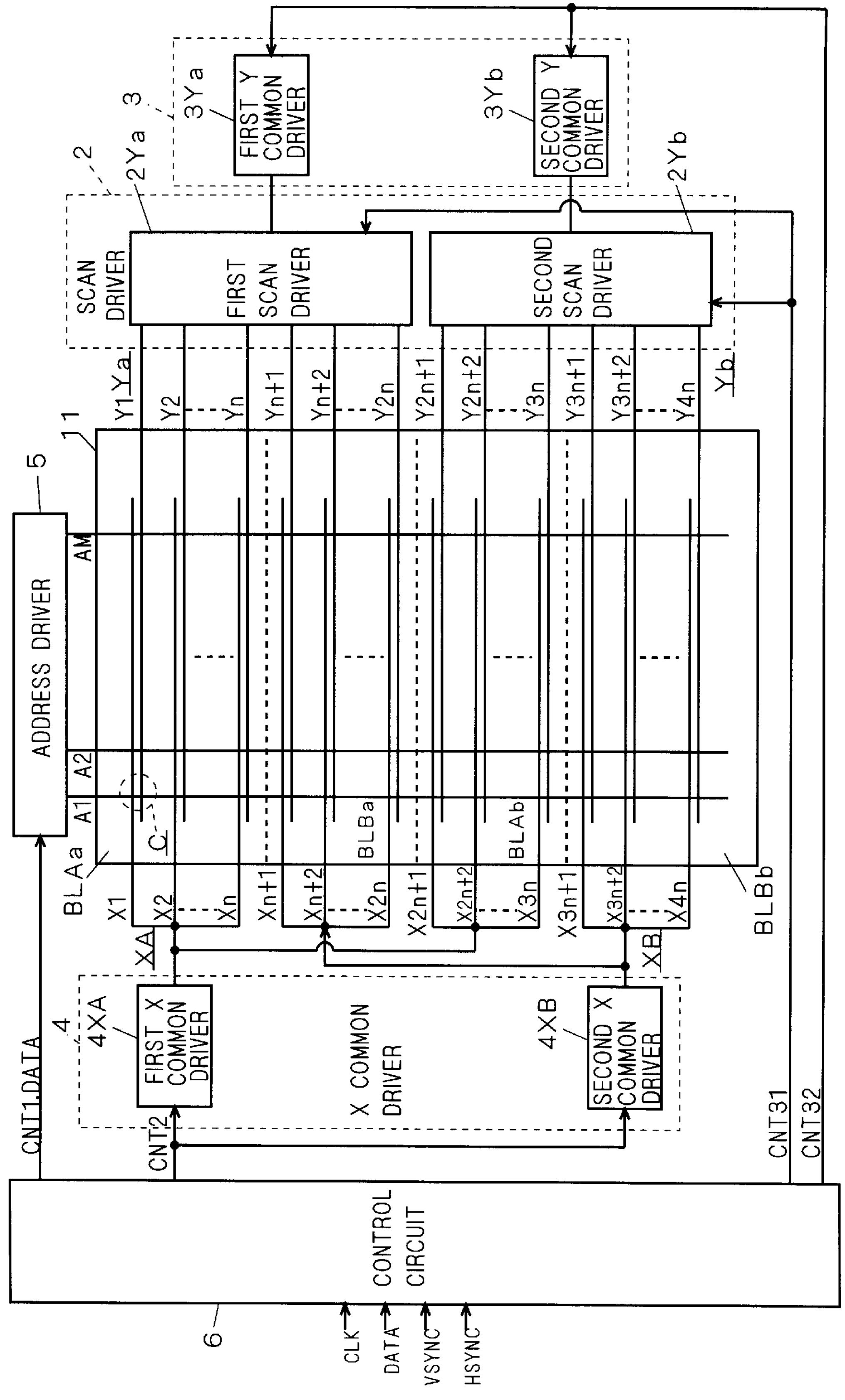
FIG. 1 typically illustrates the overall structure of a plasma display device according to a first embodiment of the present invention.
Figure 22:
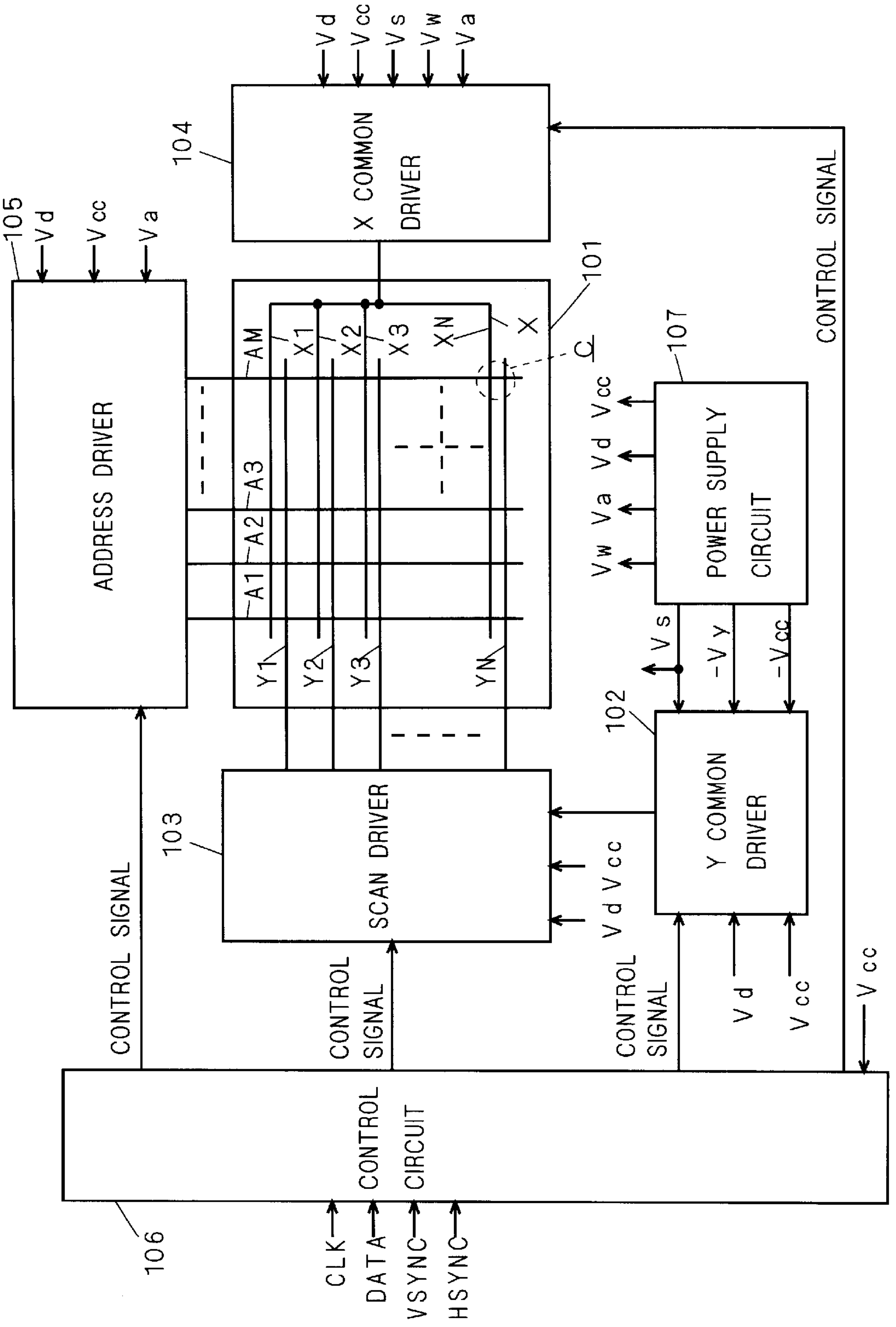
FIG. 22 (PRIOR ART)
FIG. 22 typically illustrates the overall structure of a conventional plasma display device.

FIG. 1 typically illustrates the overall structure of a plasma display device according to a first embodiment of the present invention. As shown in FIG. 1, this device roughly comprises a plasma display panel (PDP) 11, an X common driver 4 including first and second X common drivers 4XA and 4XB, a Y common driver 3 including first and second Y common drivers 3Y*a* and 3Y*b*, a scan driver 2 including first and second scan drivers 2Y*a* and 2Y*b*, an address driver 5 and a control circuit 6 common to the drivers 2 to 5. Thus, in this device, the structure of each of the X common driver 104, the Y common driver 102 and the scan driver 103 in the conventional plasma display device shown in FIG. 22 is divided into two parts. In particular, a driving device for this plasma display device implementing a driving method described below includes the X common driver 4 and the Y common driver 3. Although FIG. 1 omits illustration, the plasma display device comprises a power supply circuit (corresponding to the power supply circuit 107 shown in FIG. 22) generating and outputting power supply voltages necessary for the drivers 2 to 5 and the control circuit 6 respectively.

Figure 23:
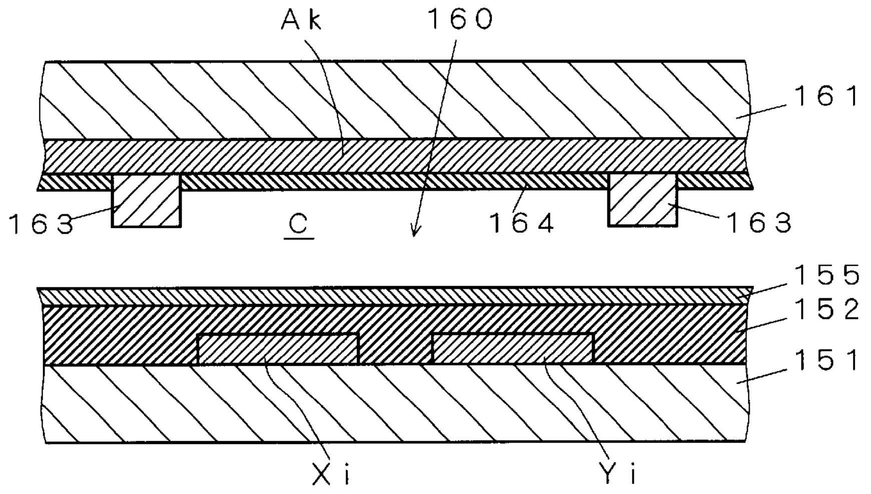
FIG. 23 (PRIOR ART)
FIG. 23 is a longitudinal sectional view of a discharge cell of a conventional plasma display panel.

In the following description, a three-electrode alternating current (AC) PDP (see FIG. 23, for example) is applied as the PDP 11 in this device. However, connection between electrodes of the PDP and the drivers and a method of driving the PDP characterizing the present invention are also applicable to an opposite two-electrode alternating PDP shown in FIG. 14 described later or a direct current (DC) PDP. This point is clarified in the first embodiment and second to fourth embodiments described later.

A general three-electrode AC-PDP is applicable to the PDP 11 as described above, and hence FIG. 1 typically illustrates only N (N=4n (n: natural number) in FIG. 1) sustain electrodes (first electrodes) X1 to XN, N scan electrodes (second electrodes) Y1 to YN and M address electrodes A1 to AM, necessary for the following description, forming the PDP 11. It is obvious from symmetry of the structure of the PDP 11 that the scan electrodes may alternatively be referred to as "first electrodes" and the sustain electrodes may alternatively be referred to as "second electrodes". As shown in FIG. 1, the sustain electrodes Xi (i: 1 to 4n) and the scan electrodes Yi pairing with the sustain electrodes Xi are arranged in parallel with each other. The address electrodes Am (m: 1 to M) are arranged perpendicularly to the aforementioned pairs of electrodes Xi and Yi (to three-dimensionally intersect with the same as those of the PDP shown in FIG. 23). In this case, N by M (three-dimensional) intersections formed by the pairs of electrodes Xi and Yi and the address electrodes Am define discharge cells or emission cells C.

Particularly in this plasma display device, the N (=4n) sustain electrodes X1 to **X4*n* are divided into sustain electrodes X1 to Xn and electrodes X2*n*+1 to X3*n* forming a first sustain electrode group (first electrode group) XA and sustain electrodes Xn+1 to X2*n* and electrodes X3*n*+1 to X4*n* forming a second sustain electrode group (first electrode group) XB. The respective electrodes forming the first sustain electrode group XA are connected to the first X common driver 4XA in common, and the respective electrodes forming the second sustain electrode group XB are connected to the second X common driver 4XB** in common.

On the other hand, the N (=4n) scan electrodes Y1 to **Y4*n* are divided into scan electrodes Y1 to Y2*n* forming a first scan electrode group (second electrode group) Ya and scan electrodes Y2*n*+1 to Y4*n* forming a second scan electrode group (second electrode group) Yb. The respective electrodes forming the first scan electrode group Ya are connected to the first Y common driver 3Y*a* in common through the first scan driver 2Y*a* having output terminals connected with these electrodes respectively, and the respective electrodes forming the second scan electrode group Yb are similarly connected to the second Y common driver 3Y*b* in common through the second scan driver 2Y*b*** having output terminals connected with these electrodes respectively.

In this case, the first and second X common drivers 4XA and 4XB can be formed by dividing an X common driver 4 equivalent in structure to the conventional X common driver 104 (see FIG. 22) into two groups. Similarly, the first and second scan drivers **2Y*a* and 2Y*b* can be formed by dividing a scan driver 2 equivalent in structure to the conventional scan driver 102 (see FIG. 22) into two groups, and the first and second Y common drivers 3Y*a* and 3Y*b* can be formed by dividing a Y common driver 3 equivalent in structure to the conventional Y common driver 103 (see FIG. 22**) into two groups.

In the following description,

① pairs of electrodes Xi and Yi formed by the sustain electrodes belonging to the first sustain electrode group (one first electrode group) XA and the scan electrodes belonging to the first scan electrode group (one second electrode group) Ya are referred to as "(first) electrode pair group or block BLAa". Similarly, ② pairs of electrodes Xi and Yi formed by the sustain electrodes belonging to the second sustain electrode group (the other first electrode group) XB and the scan electrodes belonging to the first scan electrode group Ya are referred to as "(second) electrode pair group or block BLBa", ③ pairs of electrodes Xi and Yi formed by the sustain electrodes belonging to the first sustain electrode group XA and the scan electrodes belonging to the second scan electrode group (the other second electrode group) Yb are referred to as "(third) electrode pair group or block BLAb", and ④ pairs of electrodes Xi and Yi formed by the sustain electrodes belonging to the second sustain electrode group XB and the scan electrodes belonging to the second scan electrode group Yb are referred to as "(fourth) electrode pair group or block BLBb".

Thus, in this plasma display device, the sustain electrodes X1 to **X4*n* are divided into two groups (the sustain electrode groups XA and XB) and the scan electrodes Y1 to Y4*n* are divided into two groups (the scan electrode groups Ya and Yb) and the common drivers 4XA, 4XB, 3Y*a* and 3Y*b* are provided for the groups XA, XB, Ya and Yb respectively (the scan driver groups 2Y*a* and 2Y*b* corresponding to the Y common drivers 3Y*a* and 3Y*b* are further provided for the scan electrode groups Ya and Yb). In particular, these are combined in the form of a 2 by 2 matrix, whereby the electrode pairs Xi and Yi of the PDP are divided into the aforementioned four blocks BLAa, BLAb, BLBa and BLBb while the PDP 11** is driven by the two common drivers provided on the sustain electrode side and the two common drivers provided on the scan electrode side.

In the plasma display device shown in FIG. 1, the control circuit 6 equivalent in structure to the conventional control circuit 106 (see FIG. 22) generates and outputs sequence control signals CNT1, CNT2, CNT31 and CNT32 controlling the respective drivers on the basis of input image data DATA and input timing signals such as a clock signal CLK, a vertical synchronizing signal VSYNC, a horizontal synchronizing signal HSYNC and the like.

On the basis of the control signal CNT2, the first and second X common drivers 4XA and 4XB supply prescribed voltages to the first sustain electrode group XA and the second sustain electrode group XB respectively. The first and second Y common drivers **3Y*a* and 3Y*b* execute prescribed operations on the basis of the control signal CNT32, and the first and second scan drivers execute prescribed operations on the basis of the control signal CNT31**.

Each of the first and second Y common drivers **3Y*a* and 3Y*b* and the first and second X common drivers 4XA and 4XB generates and outputs a voltage or a voltage pulse, such as a priming pulse or a sustain pulse, for example, supplied to a plurality of scan electrodes or sustain electrodes in common. The scan driver 2 ① generates and outputs a voltage or a driving pulse such as a scan pulse, for example, individually supplied to each of the N scan electrodes Y1 to YN, and ② receives the voltage generated in the Y common driver 3 and transmits the same to the respective scan electrodes Y1** to YN.

The address driver 5 supplies a prescribed voltage pulse serving as an address pulse to the respective ones of the M address electrodes A1 to AM connected to the respective output terminals on the basis of the aforementioned control signal CNT1 and the image data DATA input through the control circuit 6. A detailed driving method is now described.

(Driving Method in Plasma Display Device of FIG. 1)

Figure 24:
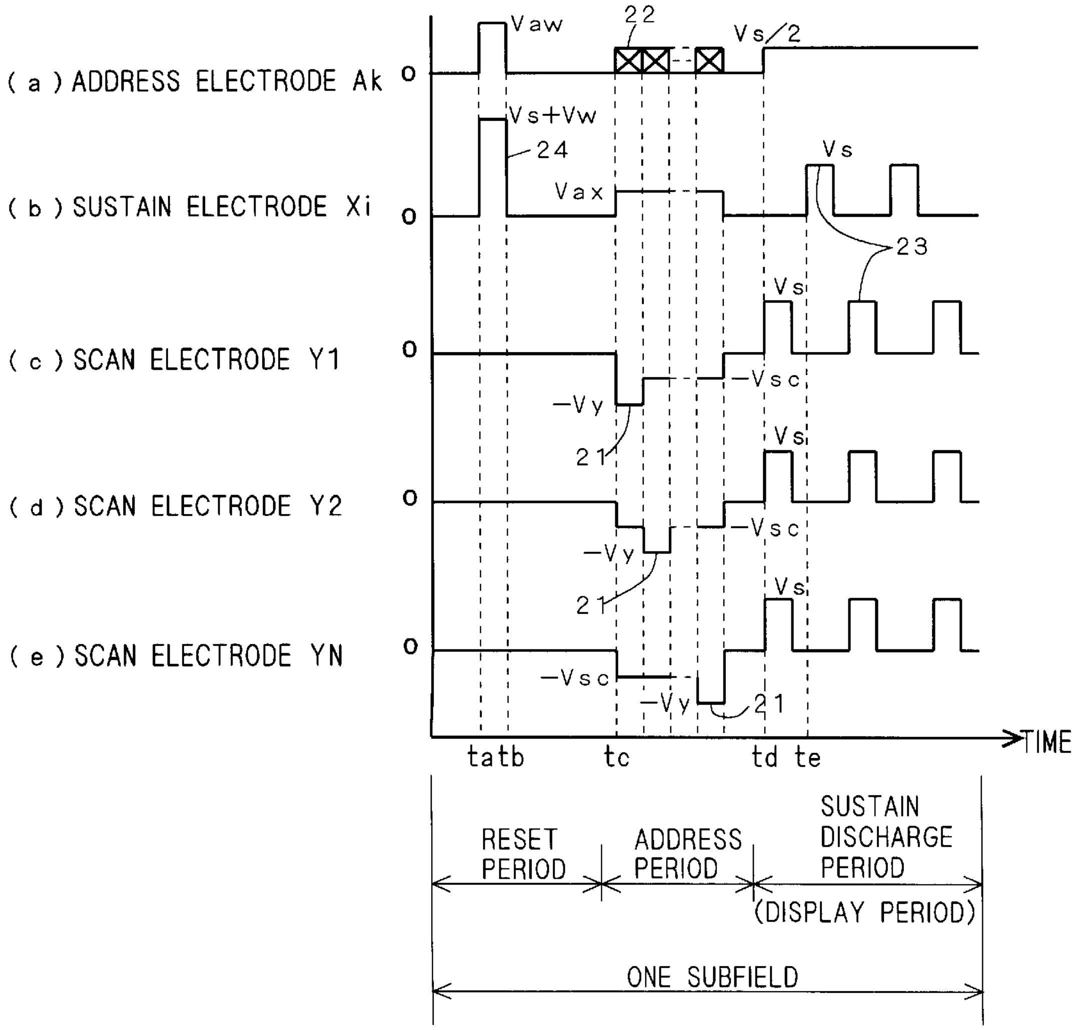
FIG. 24 (PRIOR ART)
FIG. 24 is a timing chart showing the waveforms of voltages applied to electrodes in a conventional driving method for the plasma display panel.
Figure 25:
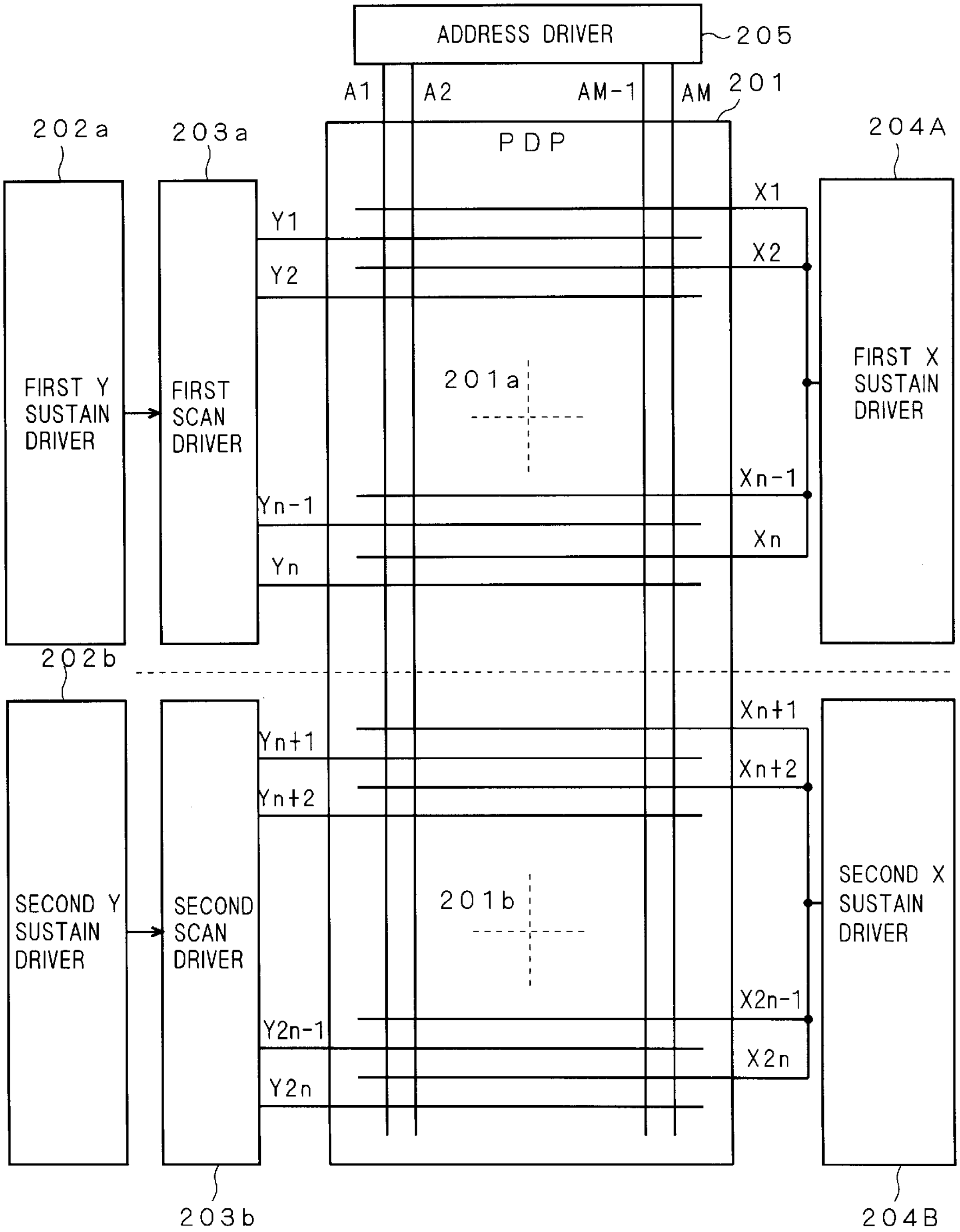
FIG. 25 (PRIOR ART)
FIG. 25 typically illustrates the structure of a plasma display device according to second prior art.
Figure 26:
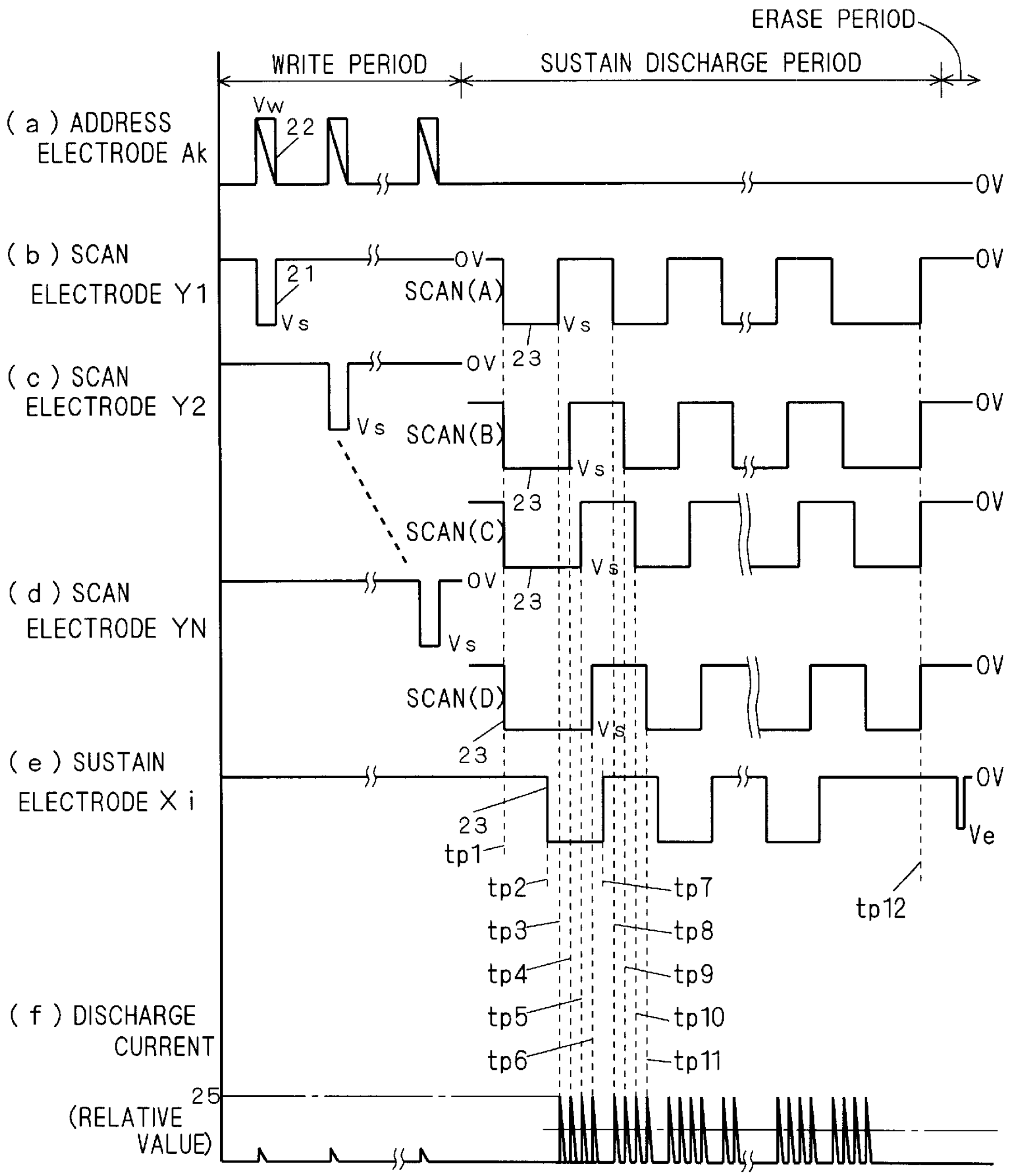
FIG. 26 (PRIOR ART)
FIG. 26 is a timing chart showing the waveforms of voltages applied to electrodes in a method of driving a plasma display panel according to third prior art.
Figure 27:
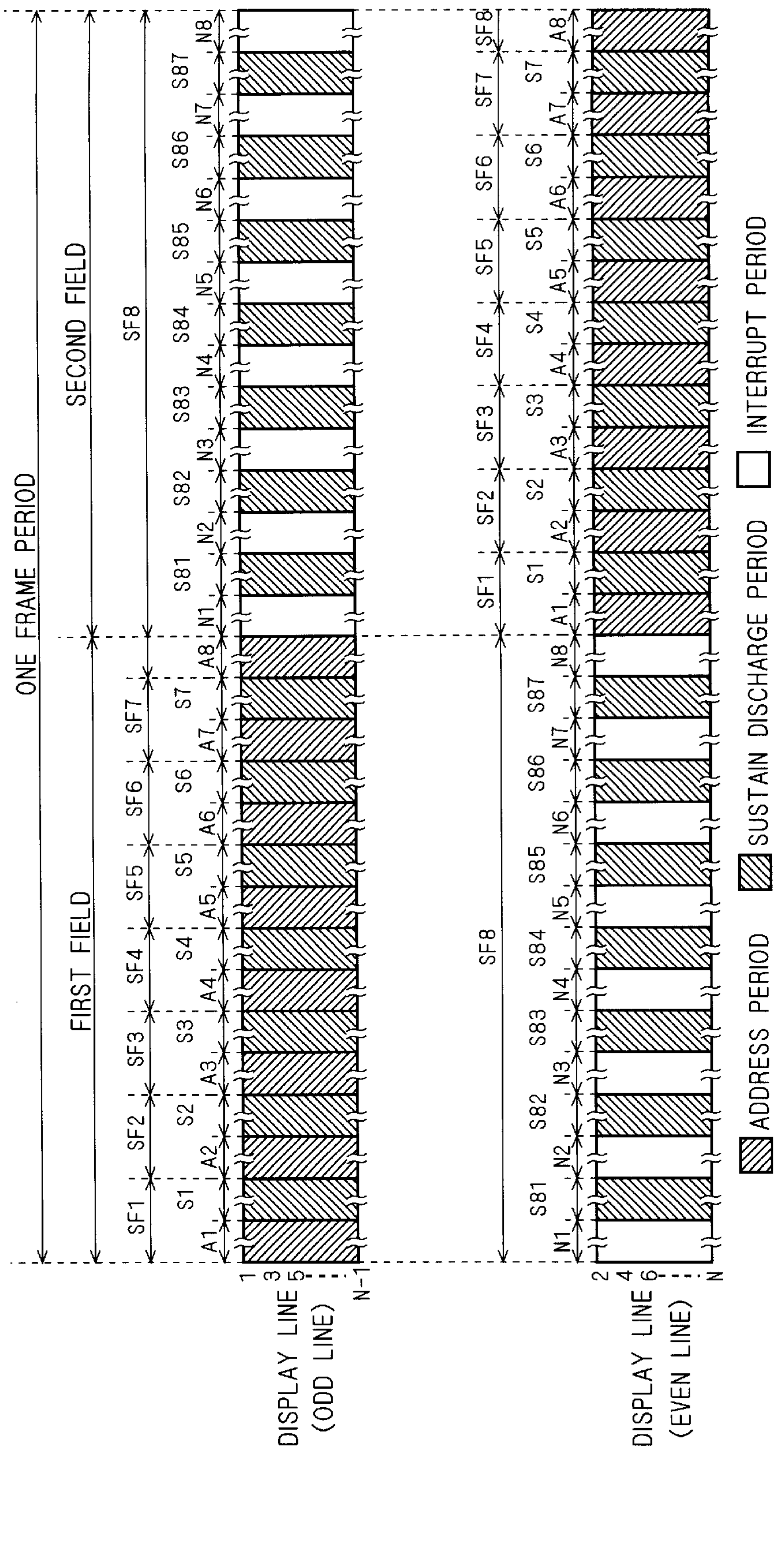
FIG. 27 (PRIOR ART)
FIG. 27 is a timing chart for illustrating a method of driving a plasma display according to fourth prior art.

As the driving method for the PDP 11 in the plasma display device according to the first embodiment, the method dividing each frame (16.6 msec. in the case of a television image, for example) into a plurality of subfields each having a reset period, an address period and a sustain period shown in FIG. 24, for example, is basically applicable.

In each subfield of the aforementioned driving method, a priming pulse is applied to the sustain electrodes Xi in the reset period for generating discharge in all discharge cells C. Wall charges remaining as the display history in a preceding subfield are erased by self erase discharge generated when the aforementioned priming pulse falls. In the subsequent address period, a scan pulse is sequentially applied to the scan electrodes Y1 to Yn while an address pulse is applied to the address electrodes, thereby forming address discharge or write discharge in the discharge cell C to be turned on for display in the subsequent sustain period. Wall charges are stored in the aforementioned discharge cell C to be turned on for display by such address discharge. Thereafter in the sustain discharge period or the sustain period subsequent to the address period, a sustain pulse is alternately applied to the scan electrodes Yi and the sustain electrodes Xi forming the electrode pairs, whereby sustain discharge carrying out display emission of the PDP is generated only in the discharge cell having the aforementioned wall charges when the sustain pulse rises.

Particularly in this plasma display device, a characteristic driving method based on division of the respective electrodes forming the aforementioned electrode groups XA, XB, Ya and Yb or the electrode pair groups BLAa, BLAb, BLBa and BLBb is employed. This driving method is applicable to the case of simultaneously supplying the same voltage such as the sustain pulse or the priming pulse to the plurality of electrodes, e.g., in the sustain period or the reset period. Basic operations of the driving method in the plasma display device according to the first embodiment are first described, followed by more concrete and practical description of the driving method.

Figure 2:
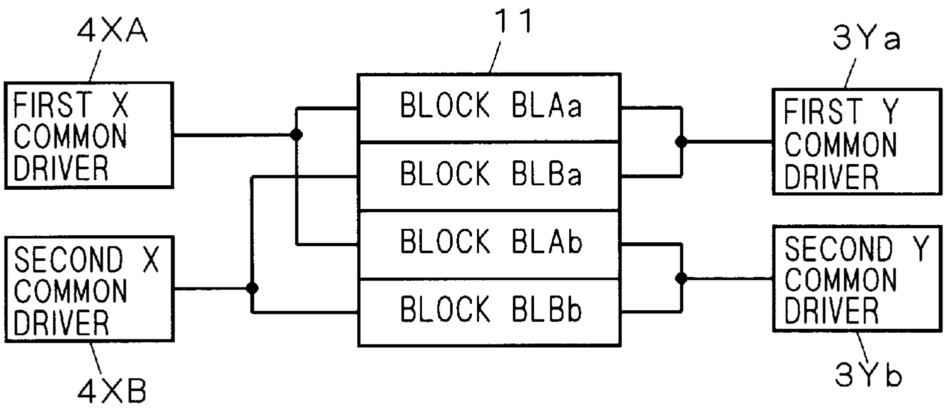
FIG. 2 is a model diagram showing connection between divided blocks and common drivers in the plasma display device according to the first embodiment.

FIG. 2 typically illustrates the connection mode between the sustain electrodes X1 to X4*n* and the X common driver 4 and the connection mode between the scan electrodes Y1 to Y4*n* and the Y common driver 3 in the PDP 11 shown in FIG. 1. FIG. 2 illustrates only the components necessary for the following description. In consideration of that the driving method according to the first embodiment is applied to the case of simultaneously supplying the same voltage to the plurality of electrodes, FIG. 2 omits illustration of the scan driver 2 necessary for supplying a prescribed voltage to each electrode as described above. This also applies to figures related to the following description. As shown in FIG. 2, the first X common driver 4XA is connected with the blocks BLAa and BLAb, and the second X common driver 4XB is connected with the blocks BLBa and BLBb in relation to the aforementioned four blocks BLAa, BLAb, BLBa and BLBb. On the other hand, the first Y common driver 3Y*a* is connected with the blocks BLAa and BLBa, and the second Y common driver 3Y*b* is connected with the blocks BLAb and BLBb.

FIGS. 3 to 6 corresponding to FIG. 2 are diagrams for illustrating the basic operations of the driving method for this device, showing patterns of voltage supply by combination of the X common drivers 4XA and 4XB and the Y common drivers 3Y*a* and 3Y*b* and in which one of the aforementioned four blocks BLAa, BLAb, BLBa and BLBb discharge (discharge such as sustain discharge or priming discharge generated by simultaneously applying a pulse to a plurality of electrodes as already described) is generated.

Figure 3:
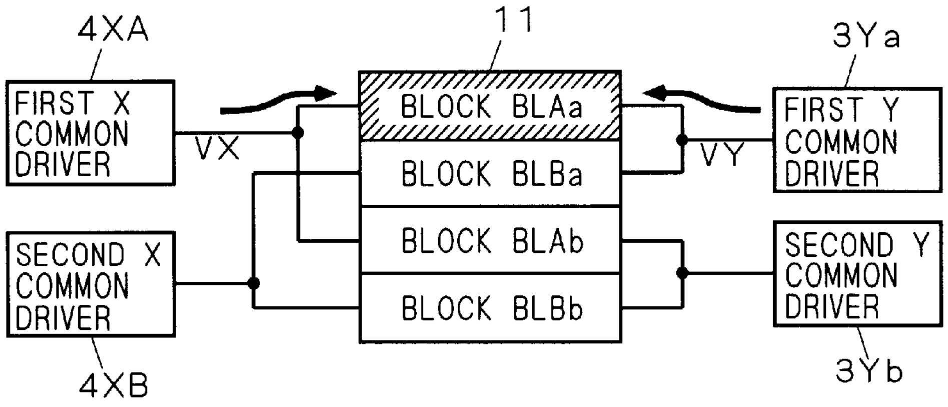
FIGS. 3 to 6 are model diagrams for illustrating a driving method in the plasma display device according to the first embodiment.

When supplying a prescribed voltage VX from the first X common driver 4XA while simultaneously supplying a prescribed voltage VY from the first common driver 3Y*a* as shown in FIG. 3, discharge is generated (across the pairs of electrodes Xi and Yi) in the block BLAa supplied with the voltages from the drivers 4XA and 3Y*a*. It is assumed that each of the voltages supplied as the aforementioned voltages VX and VY itself is less than a discharge start voltage in the discharge cells but the potential difference |VX−VY| therebetween has a sufficient voltage value capable of generating discharge across the pairs of electrodes Xi and Yi.

Figure 4:
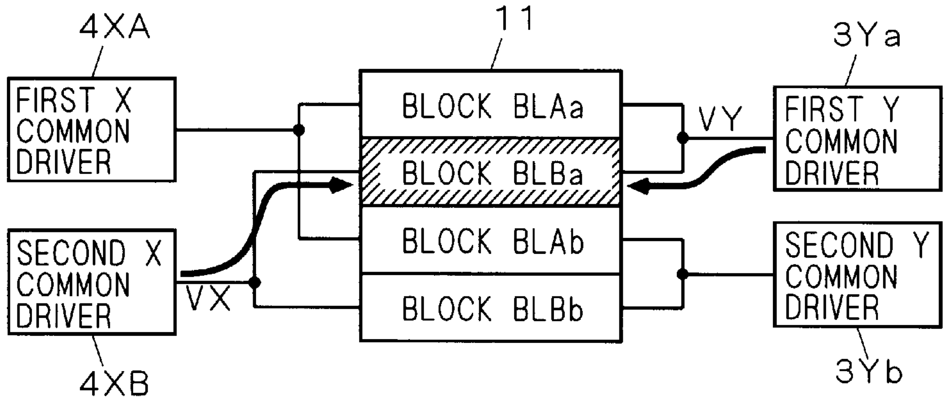

Similarly, discharge is generated (across the pairs of electrodes Xi and Yi) in the block BLBa when supplying the voltage VX from the second X common driver 4XB while simultaneously supplying the voltage VY from the first Y common driver 3Y*a* (see FIG. 4). Further, discharge is generated (across the pairs of electrodes Xi and Yi) in the block BLAb when supplying the voltages VX and VY from the first X common driver 4XA and the second Y common driver 3Y*b* respectively (see FIG. 5), and discharge is generated (across the pairs of electrodes Xi and Yi) in the block BLBb when supplying the voltages VX and VY from the second X common driver 4XB and the second Y common driver 3Y*b* respectively (see FIG. 6). Respective output voltages from the first and second X common drivers and respective output voltages from the first and second Y common drivers can be set to different voltage values so far as the four output voltage can satisfy relation similar to that between the aforementioned voltages VX and VY.

Thus, the plasma display device according to the first embodiment executes discharge at staggered timing between the blocks by properly controlling the two X common drivers and the two Y common drivers provided for the pairs of electrodes Xi and Yi divided into four blocks. When grasping loads on the common drivers in view of (i) the peak current in discharge and (ii) power loss, therefore, the following effects can be attained in this plasma display device as compared with the conventional driving method, i.e., the driving method simultaneously generating discharge on the full screen of the PDP or in all discharge cells without dividing the common drivers:

(i) The moment discharge is generated in the block BLAa in the operation shown in FIG. 3, for example, ¼ of a peak current that in the case of simultaneously generating discharge on the full screen or in all discharge cells C flows in the common drivers XA and Ya. In other words, the ¼ peak current flows in each of the first X common driver 4XA and the first Y common driver 3Y*a*. This also applies to each of the operations shown in FIGS. 4 to 6, i.e., the case of generating discharge in each of the blocks BLBa, BLAb and BLBb. When driving the plasma display device with a cycle formed by the four operations shown in FIGS. 3 to 6 (the order of the operations is arbitrary), a peak current substantially half that in the conventional driving method flows in the X common driver 4 and the Y common driver 3. Therefore, the allowable peak current value required to the X common driver 4XA and the Y common driver 3 can be halved as compared with that in each common driver of the conventional plasma display device.

(ii) Power loss of this plasma display device is now considered. As hereinabove described, the peak current half that in the conventional plasma display device flows in each of the common drivers 3 and 4 twice in the operations of the aforementioned cycle. It is conceivable that the effective value of the current is approximately proportional to the square of the peak current and proportional to the frequency of the peak current, and hence the effective value of the current in this device is about $2\times(\frac{1}{2})^2=\frac{1}{2}$ that in the conventional plasma display device. In the plasma display device according to the first embodiment, therefore, power loss in the common driver can be reduced to half that of the conventional driver when the internal resistance of the overall common driver 3 or 4 is identical to that of the conventional common driver. In other words, the aforementioned internal resistance of each of the X common driver 4 and the Y common driver 3 can be allowed up to a value twice that of the conventional common driver when power loss in the common driver 3 or 4 is substantially identical to that in the conventional common driver.

According to the aforementioned effects (i) and (ii), this plasma display device can promote miniaturization of each common driver circuit, cost reduction and reduction of power consumption as compared with the conventional device.

A more concrete and practical driving method for executing the operations shown in FIGS. 3 to 6 is now described. The following description is made with reference to the driving method shown in FIG. 24, for example.

(Driving Method in Sustain Period)

Figure 7:
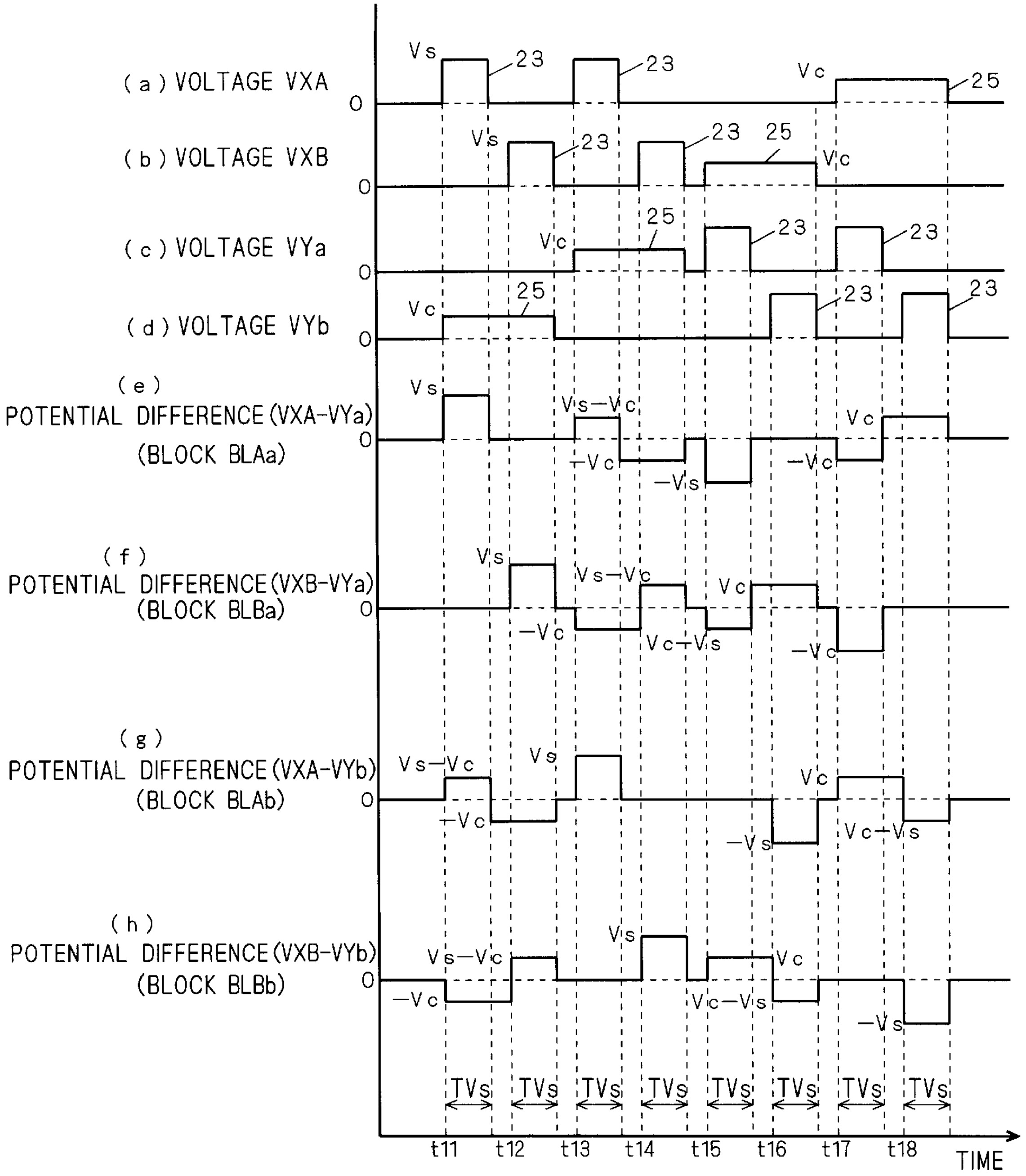
FIG. 7 is a timing chart showing the waveforms of voltages applied to respective electrodes in a sustain period in the driving method according to the first embodiment.

FIG. 7 is a timing chart showing the waveforms of voltages applied to the sustain electrodes and the scan electrodes in the sustain period in the driving method applied to the plasma display device shown in FIG. 1. Referring to FIG. 7, (a) to (d) show the waveforms of an output voltage VXA from the first X common driver 4XA, an output voltage VXB from the second X common driver 4XB, an output voltage VYa from the first Y common driver 3Y*a* and an output voltage VYb from the second X common driver 3Y*b* respectively. Further, (e) to (h) in FIG. 7 show the potential differences (VXA−VYa), (VXB−VYa), (VXA−VYb) and (VXB−VYb) respectively. In other words, (e) to (h) in FIG. 7 show (external) voltages supplied to the discharge cells belonging to the blocks BLAa, BLBa, BLAb and BLBb respectively.

(Time t11 to Time t12)

When the first X common driver 4XA outputs a sustain pulse 23 having a voltage (value) Vs as the output voltage VXA while the first Y common driver 3Y*a* outputs a voltage (value) 0 as the output voltage VYa at a time t11 as shown at (a) and (c) in FIG. 7, the potential difference (VXA−VYa) reaches Vs as shown at (e) in FIG. 7. At this time, the voltage value Vs is set as follows: The voltage value Vs is so set that sustain discharge cannot be formed in the discharge spaces of the discharge cells with only (the absolute value or the magnitude of) the voltage value Vs but sustain discharge can be generated in a discharge cell forming wall charges in the address period (see FIG. 24) preceding the sustain period by superposition of the potential (or an electric field) by the wall charges and the voltage value Vs. At the time t11, therefore, sustain discharge is generated in the discharge cell forming wall charges in the address period, i.e., subjected to a write operation among the discharge cells belonging to the block BLAa (see FIG. 3).

At this time, the second Y common driver 3Y*b* outputs a sustain cancel pulse 25 having a voltage (value) Vc as the output voltage VYb at least in the period outputting the sustain pulse 23 or a time TVs. Thus, generation of sustain discharge in the block BLAb is avoided by setting the (magnitude of) voltage supplied to the block BLAb supplied with the voltage VXA along with the block BLAa to a voltage value allowing no discharge in the discharge cells. The (magnitudes of) aforementioned voltage (value) Vc itself as well as the potential difference (Vs−Vc) and a voltage obtained by superposing the voltage by the aforementioned wall charges on this voltage (Vs−Vc) are set to values smaller than the minimum voltage (minimum sustain voltage) necessary for generating sustain discharge. The voltage (value) Vc is preferably set to about a voltage (value) Vs/2. Thus, generation of sustain discharge in the block BLAb is avoided by setting the external voltage supplied to the block BLAb to the voltage (Vs−Vc).

The potential difference (VXB−VYa) between the sustain electrodes and the scan electrodes belonging to the block BLBa is the voltage value 0 and hence no sustain discharge is generated in the discharge cells belonging to the block BLBa regardless of presence/absence of wall charges. Further, the potential difference (VXB−VYb) between the sustain electrodes and the scan electrodes belonging to the block BLBb is the voltage value (−Vc). The voltage value Vc is set smaller than the minimum sustain voltage as described above, and hence no sustain discharge is generated in the block BLBb.

As hereinabove described, sustain discharge is generated only in the discharge cells (subjected to writing in the address period) belonging to the block BLAa among the four blocks BLAa, BLAb, BLBa and BLBb at the time t11 (see FIG. 3).

(Time t12 to Time t13)

Similarly, the second X common driver 4XB and the second Y common driver 3Y*b* output the voltages VXB=Vs and VYb=Vc at a time t12, whereby sustain discharge is generated in a prescribed discharge cell belonging to the block BLBa (see FIG. 4).

(Time t13 to Time t14)

Figure 5:
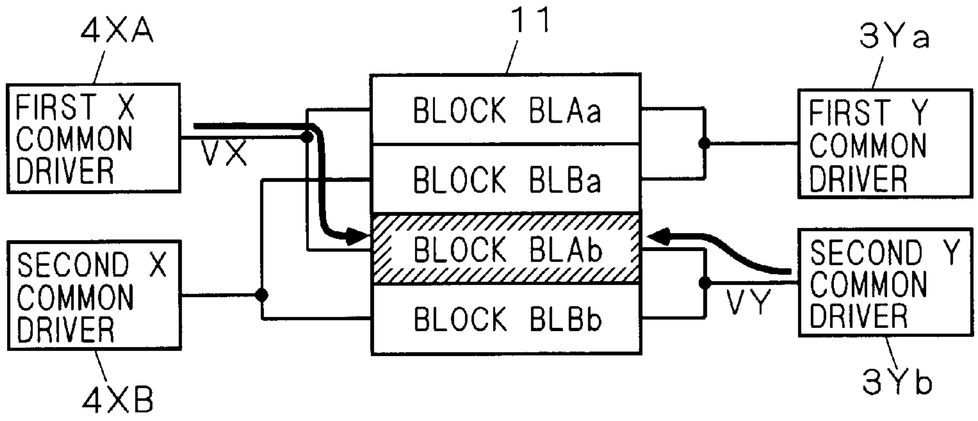

At a time t13, the first X common driver 4XA and the first Y common driver 3Y*a* output the voltages VXA=Vs and VYa=Vc respectively, whereby sustain discharge is generated in a prescribed discharge cell belonging to the block BLAb (see FIG. 5).

(Time t14 to Time t15)

Figure 6:
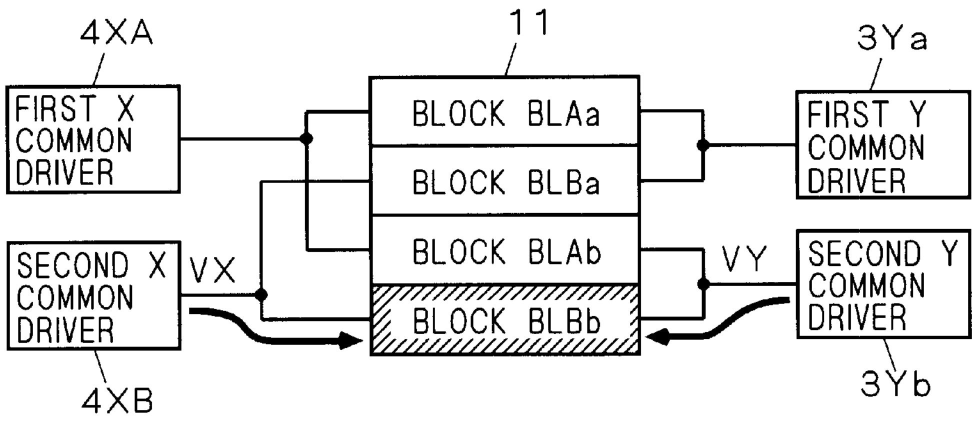

At a time t14, the second X common driver 4XB and the first Y common driver 3Y*a* output the voltages VXB=Vs and VYa=Vc respectively, whereby sustain discharge is generated in a prescribed discharge cell belonging to the block BLBb (see FIG. 6).

(Time t15 to Time t18 (+time TVs))

At each of subsequent times t15, t16, t17 and t18, the voltages Vs and Vc are properly supplied to the blocks BLAa, BLAb, BLBa and BLBb, thereby generating sustain discharge only in a prescribed one of the four blocks BLAa, BLAb, BLBa and BLBb, as shown in FIG. 7. At this time, the voltages supplied to the blocks BLAa, BLAb, BLBa and BLBb are out of phase with those at the aforementioned times t11 to t14 (+time TVs), as shown at (e) to (h) in FIG.

7. In other words, such a series of operations generate sustain discharge of the PDP with voltage supply out of phase with that at the aforementioned times t11 to t14 (+time TVs). The sustain discharge generated at the times t15, t16, t17 and t18 is referred to as "out-of-phase sustain discharge" with respect to the sustain discharge at the times t11, t12, t13 and t14.

The aforementioned series of operations form one cycle of sustain discharge of the overall PDP.

(Driving Method in Reset Period)

Figure 8:
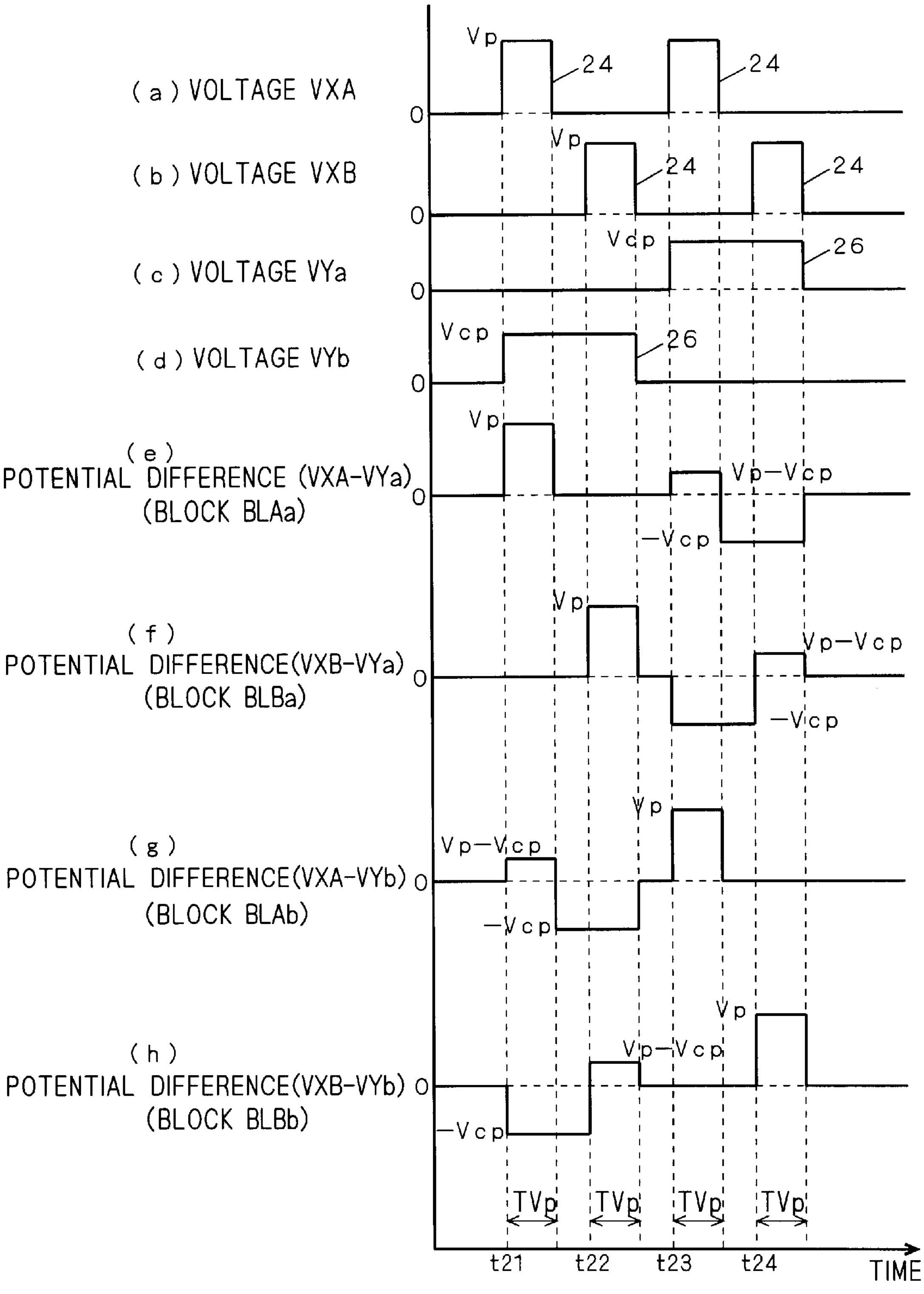
FIG. 8 is a timing chart showing the waveforms of voltages applied to the respective electrodes in a reset period in the driving method according to the first embodiment.

FIG. 8 is a timing chart showing the waveforms of voltages applied to the sustain electrodes and the scan electrodes in the reset period in the driving method applied to the plasma display device shown in FIG. 1. Referring to FIG. 8, (*a*) to (*h*) show the waveforms of the output voltages VXA, VXB, VYa and VYb and the potential differences (VXA−VYa), (VXB−VYa), (VXA−VYb) and (VXB−VYb) respectively.

(Time t21 to Time t22)

At a time t21, the first X common driver 4XA outputs a priming pulse 24 having a voltage (value) Vp as the output voltage VXA while the first Y common driver 3Y*a* outputs the voltage (value) 0 as the output voltage VYa, as shown at (a) and (c) in FIG. 8. Thus, priming discharge is generated in the discharge cells belonging to the block BLAa supplied with the potential difference (VXA−VYa)=Vp, as shown at (e) in FIG. 8. At this time, the (magnitude of) voltage value Vp is set to a level capable of generating priming discharge or a full write pulse in the discharge cells regardless of the display history in the subfield preceding the reset period.

Similarly to the aforementioned driving method in the sustain period, further, the second Y common driver 3Y*b* outputs a priming cancel pulse 26 having a voltage (value) Vcp as the output voltage VYb at least in the period outputting the priming pulse 24 or a time TVp. Thus, generation of priming discharge in the block BLAb is avoided by setting the (magnitude of) voltage supplied to the block BLAb supplied with the voltage VXA along with the block BLAa to a value allowing no discharge in the discharge cells. The (magnitudes of) aforementioned voltage (value) Vcp itself as well as the potential difference (Vp−Vcp) and a voltage obtained by superposing the voltage by the wall charges remaining as the display history in the preceding subfield on this voltage (Vp−Vcp) are set to values smaller than the minimum voltage (minimum sustain voltage) necessary for generating priming discharge. The voltage (value) Vcp is set to about the aforementioned voltage (value) Vs, for example. Thus, generation of priming discharge in the block BLAb is avoided by setting the external voltage supplied to the block BLAb to the voltage (Vp−Vcp).

The potential difference (VXB−VYa) between the sustain electrodes and the scan electrodes belonging to the block BLBa is the voltage value 0 and hence no sustain discharge is generated in the discharge cells belonging to the block BLBa regardless of presence/absence of wall charges. Further, the potential difference (VXB−VYb) between the sustain electrodes and the scan electrodes belonging to the block BLBb is the voltage value (−Vcp). The voltage value Vcp is set smaller than the minimum voltage capable of generating priming discharge in the discharge cells as described above, and hence no priming discharge is generated in the block BLBb.

As hereinabove described, priming discharge is generated only in the discharge cells belonging to the block BLAa among the four blocks BLAa, BLAb, BLBa and BLBb at the time t21 (see FIG. 3).

(Time t22 to Time t24+(Time TVp))

Similarly at each of subsequent times t22, t23 and t24, the voltages Vp and Vcp are properly supplied to the blocks BLAa, BLAb, BLBa and BLBb, thereby generating priming discharge only in a prescribed one of the four blocks BLAa, BLAb, BLBa and BLBb (see FIGS. 7 and 3 to 6).

According to the respective driving waveforms shown in FIGS. 7 and 8, as hereinabove described, the overall PDP can be subjected to sustain discharge and priming discharge at staggered timing in the four blocks BLAa, BLAb, BLBa and BLBb in a divided manner.

Second Embodiment

The first embodiment has been described with reference to the driving method in the case of dividing the PDP into the four blocks BLAa, BLAb, BLBa and BLBb and staggering the discharge timing thereby generating sustain discharge or priming discharge in each block (see FIGS. 3 to 6). In the plasma display device according to the first embodiment, the aforementioned effects (i) and (ii) can be attained by executing discharge of the overall PDP in units of the blocks, i.e., four times. In this case, the aforementioned effects (i) and (ii) can be attained so far as discharge is not simultaneously generated in two blocks connected in common with either of the drivers 4XA, 4XB, 3Y*a* and 3Y*b*, i.e., no discharge current in a plurality of blocks concentrates to a single divided common driver in the driving method. For example, discharge in the block BLAa executed through the first X common driver 4XA and the first Y common driver 3Y*a* and discharge in the block BLBb executed through the second X common driver 4XB and the second Y common driver 3Y*b* can be simultaneously performed (see FIG. 9). Similarly, discharge in the block BLBa and discharge in the block BLAa can be simultaneously executed (see FIG. 10).

With reference to a second embodiment of the present invention, therefore, a driving method capable of implementing discharge of an overall PDP with discharge of twice in units of blocks by optimizing combination of discharge in respective blocks is described.

Figure 11:
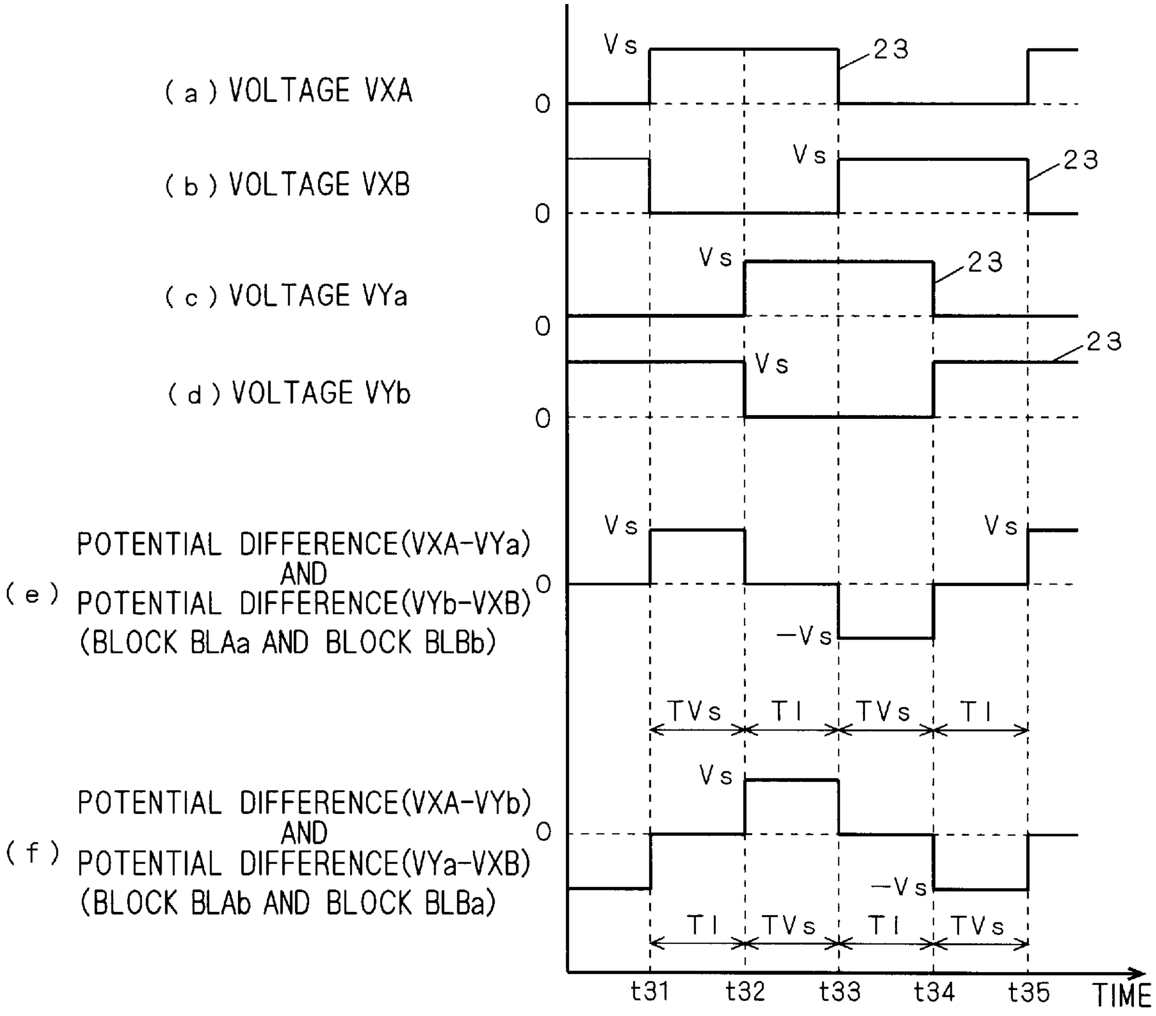
FIG. 11 is a timing chart showing the waveforms of voltages applied to respective electrodes in a sustain period in the driving method according to the second embodiment.

FIG. 11 is a timing chart showing the waveforms of voltages applied to respective electrodes in a sustain period in the driving method according to the second embodiment. Referring to FIG. 11, a period from a time t31 to a time t35 corresponds to one cycle of the sustain period. (a) to (d) in FIG. 11 show the waveforms of voltages VXA, VXB, VYa and VYb respectively. Further, (e) in FIG. 11 shows the voltage waveform of potential differences (VXA−VYa) and (VYb−VXB), i.e., (external) voltages supplied to discharge cells belonging to blocks BLAa and BLBb. Similarly, (f) in FIG. 11 shows a voltage waveform of potential differences (VXA−VYb) and (VYa−VXB), i.e., (external) voltages supplied to discharge cells belonging to blocks BLAb and BLBa. In the second embodiment and third and fourth embodiments described later, elements equivalent to those in the first embodiment are denoted by the same reference numerals, to omit redundant description.

As shown at (a) to (d) in FIG. 11, (I) a sustain pulse 23 having a duty ratio (the ratio of a voltage application period to a voltage halt period) of 50% is applied once per cycle (times t31 to t35) of the sustain period as the voltages VXA, VXB, VYa and VYb. At this time, the pulses 23 of the voltages VXA and VXB and the voltages VYa and VYb are so applied that (II) the pulses 23 of the voltages VXA and VXB are out of phase with each other and the voltages VYa and VYb are out of phase with each other and (III) the pulses 23 of the voltages VXA and VXB and the voltages VYa and VYb are 90 degrees out of phase with each other.

Due to such setting of the applied voltages, (i) the potential differences (VXA−VYa), (VYb−VXB), (VXA−VYb) and (VYa−VXB) have pulse waveforms whose polarity is inverted with time, as shown at (e) to (f) in FIG. 11. At this time, (ii) the potential differences (VXA−VYa) and (VYb−VXB) have the same waveforms, and the potential differences (VXA−VYb) and (VYa−VXB) have the same waveforms. Further, (iii) the potential differences (VXA−VYa) and (VYb−VXB) and the potential differences (VXA−VYb) and (VYa−VXB) are 90 degrees out of phase with each other.

When the voltage VXA rises from a voltage value 0 to a sustain pulse voltage Vs and the voltage VXB simultaneously falls from the voltage value Vs to the voltage value 0 at the time t31 when the voltages VYa and VYb are equal to 0 and Vs respectively, the potential differences (VXA−VYa) and (VYb−VXB) rise from the voltage value 0 to the voltage value Vs. At this time, sustain discharge is simultaneously generated in prescribed discharge cells belonging to the blocks BLAa and BLBb respectively (see FIG. 9).

At the subsequent time t32, the voltage VYa rises from the voltage value 0 to the voltage value Vs while the voltage VYb falls from the voltage value Vs to the voltage value 0. At this time, the potential differences (VXA−VYa) and (VYb−VXB) fall from the voltage value Vs to the voltage value 0 and the potential differences (VXA−VYb) and (VYa−VXB) simultaneously rise from the voltage value 0 to the voltage value Vs, to simultaneously generate sustain discharge in the blocks BLAb and BLBa (see FIG. 10).

Similarly at the times t33 to t35, voltages out of phase with those at the times t31 to t33 are supplied to the blocks BLAa, BLBa, BLAb and BLBb for generating out-of-phase sustain discharge. The series of operations at the aforementioned times t31 to t35 correspond to operations in one cycle of the sustain period.

It is obvious that the aforementioned driving method is applicable to a driving method in a reset period.

In the aforementioned driving method according to the second embodiment, the following effects can be further attained while attaining the aforementioned effects (i) and (ii) of the driving method according to the first embodiment: (iii) Discharge is simultaneously generated in two blocks, whereby the time necessary for sustain discharge can be reduced as compared with the driving method according to the first embodiment. Further, (iv) no sustain cancel pulse Vs (see FIG. 7) or the like is necessary, whereby the number of types of driving pulse waveforms is smaller than that in the driving method according to the first embodiment. Therefore, the circuit structures of common drivers XA, XB, Ya and Yb can be simplified as compared with the plasma display device according to the first embodiment. In addition, (v) the number of pulses applied in one cycle of the sustain period is smaller as compared with the driving method according to the first embodiment (see FIG. 7), whereby reactive power generated when applying the pulses, i.e., when charging/discharging capacitance components between electrodes can be reduced. Consequently, power consumption can be further reduced as compared with the plasma display device according to the first embodiment.

Third Embodiment

Figure 12:
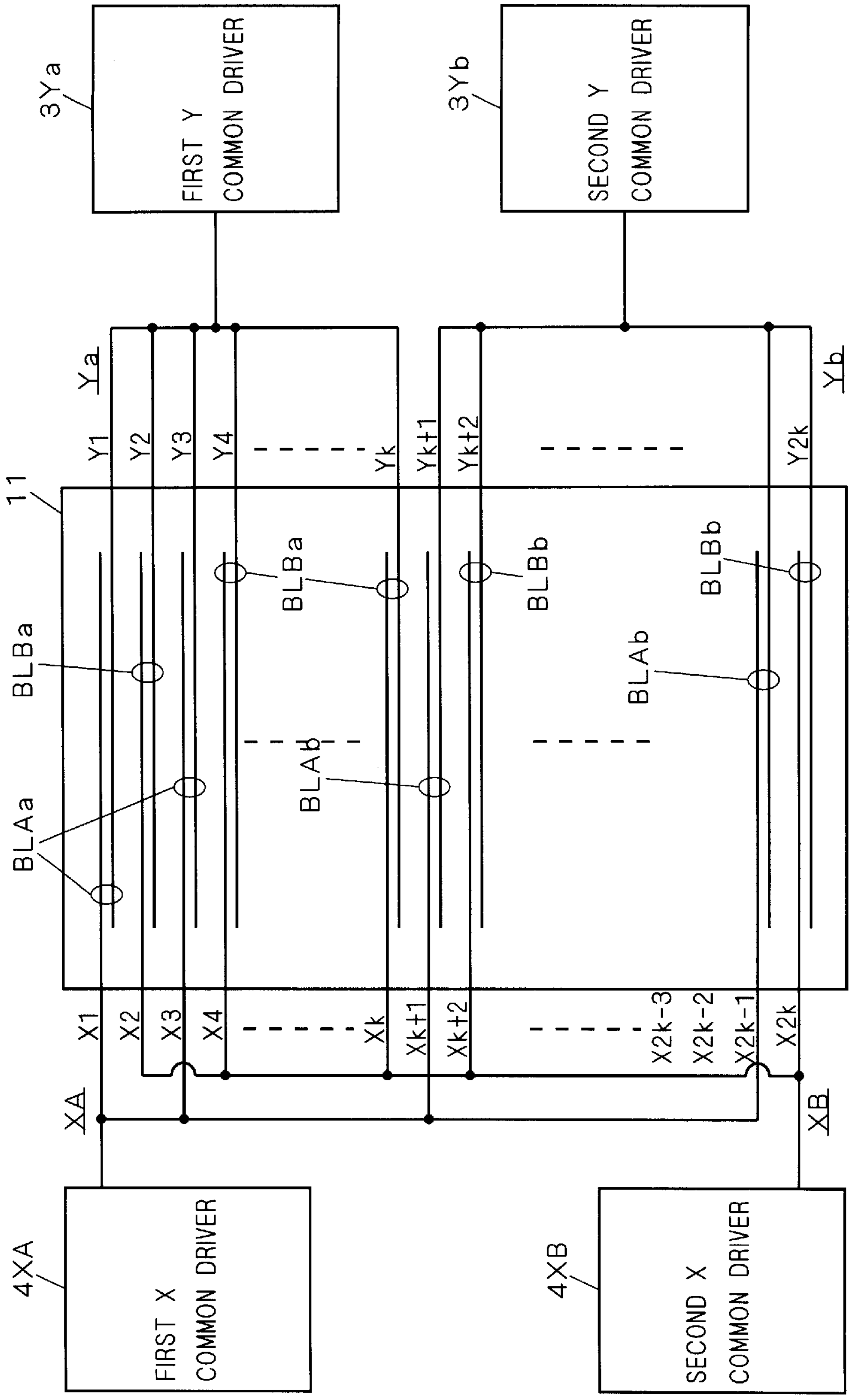
FIG. 12 is a model diagram showing first connection between sustain electrodes, scan electrodes and common drivers in a plasma display device according to a third embodiment of the present invention.
Figure 13:
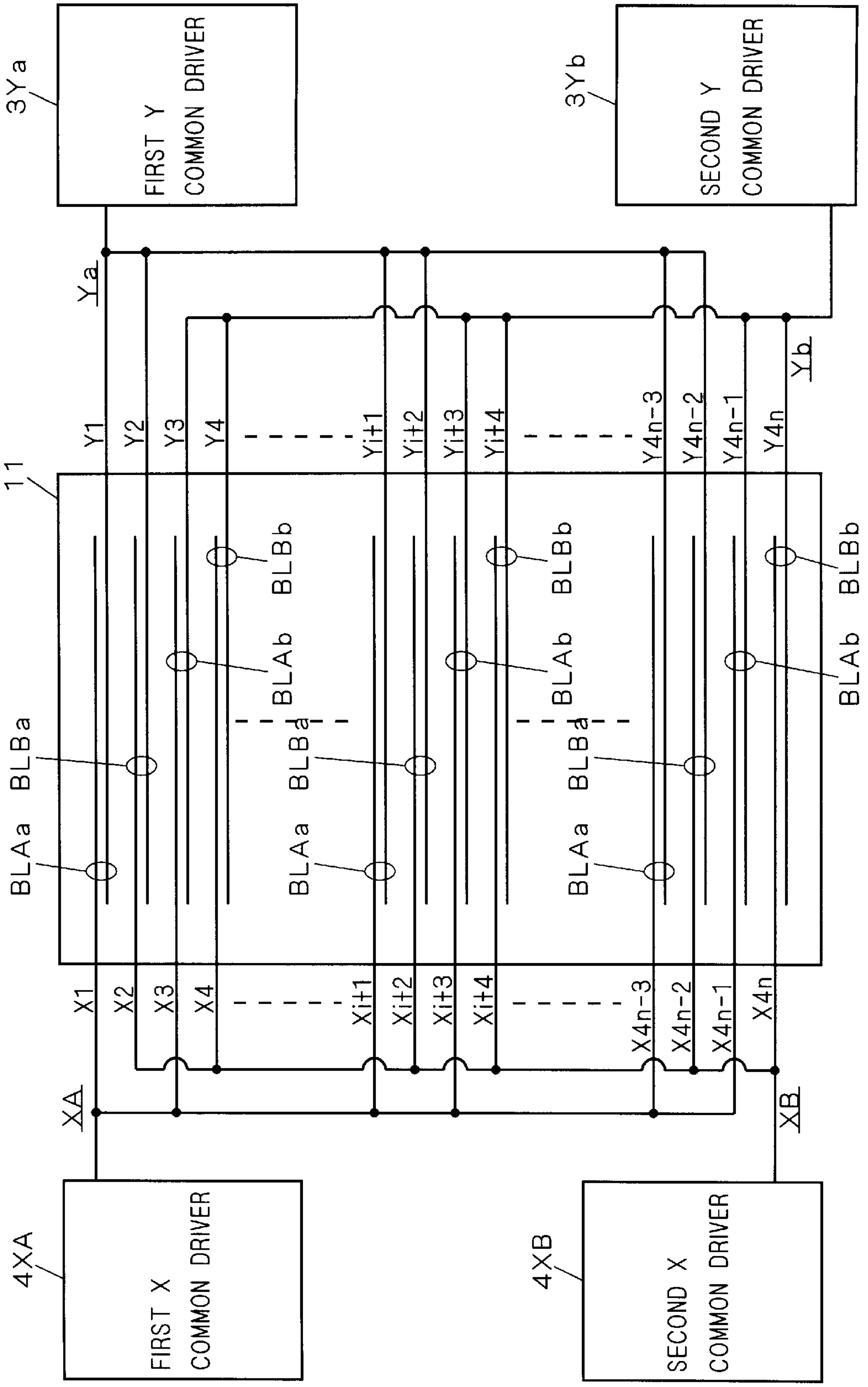
FIG. 13 is a model diagram showing second connection between the sustain electrodes, the scan electrodes and the common drivers in the plasma display device according to the third embodiment.

Each of the first and second embodiments has been described with reference to the connection between the blocks BLAa, BLAb, BLBa and BLBb and the common drivers 4XA, 4XB, 3Y*a* and 3Y*b* shown in FIG. 1. When divided scan electrode groups and sustain electrode groups are combined in the form of a matrix and the PDP is driven by the aforementioned driving method, the aforementioned effects (i) and (ii) and (iii) to (v) can be attained. Therefore, the blocks may alternatively be divided as shown in FIG. 12 or 13. FIGS. 12 and 13 show only components necessary for description thereof extracted from FIG. 1. FIGS. 12 and 13 omit illustration of first and second scan drivers 2Y*a* and 2Y*b* for a reason similar to that described above with reference to FIG. 2 etc.

As shown in FIG. 12, odd rows (forming a first sustain electrode group XA) in N (=2k) sustain electrodes X1 to X2*k* may be connected to a first X common driver 4XA while connecting even rows (forming a second sustain electrode group XB) to a second X common driver 4XB, and scan electrodes Y1 to Yk (forming a first scan electrode group Ya) corresponding to an upper half group of N (=2k) scan electrodes Y1 to Y2*k* may be connected to a first Y common driver 3Y*a* while connecting scan electrodes Yk+1 to Y2*k* (forming a second scan electrode group Yb) corresponding to a lower half group to a second Y common driver 3Y*b*. In scan lines or display lines formed by pairs of electrodes, display lines of odd rows in the upper half group belong to a block BLAa and display lines of even rows in the upper half group belong to a block BLBa. Display lines of odd rows in the lower half group belong to a block BLAb, and display lines of even rows in the lower half group belong to a block BLBb.

As shown in FIG. 13, each set may be formed by continuous four pairs of electrodes or four rows of display lines, for ① connecting the first row of each set to the first X common driver 4XA and the first Y scan driver 3Y*a*, ② connecting the second row of each set to the second X common driver 4XB and the first Y common driver 3Y*a*, ③ connecting the third row of each set to the first X common driver 4XA and the second Y common driver 3Y*b*, and ④ connecting the fourth row of each set to the second X common driver 4XB and the second Y common driver 3Y*b*. Assuming that i represents an integer of at least zero, the (4×i+1)th row corresponds to the block BLAa, the (4×i+2)th row corresponds to the block BLBa, the (4×i+3)th row corresponds to the block BLAb, and the (4×i+4)th row corresponds to the block BLBb.

While the sustain electrodes X1 to XN and the scan electrodes Y1 to YN are arranged in the order of the sustain electrode X1, the scan electrode Y1, the sustain electrode X2, the scan electrode Y2, . . . , the sustain electrode XN and the scan electrode YN in the above description, the same may alternatively be arranged in order of the scan electrode Y1, the sustain electrode X1, the scan electrode Y2, the sustain electrode X2, . . . . Further, the order of the sustain electrodes and the scan electrodes may be replaced every display line along order of the sustain electrode X1, the scan electrode Y1, the scan electrode Y2, the sustain electrode X2, . . . , the sustain electrode Xj, the scan electrode Yj, the scan electrode Yj+1 and the sustain electrode Xj+1 or order of the scan electrode Y1, the sustain electrode X1, the sustain electrode X2, the scan electrode Y2, . . . , the scan electrode Yj, the sustain electrode Xj, the sustain electrode Xj+1 and the scan electrode Yj+1.

While the driving method according to each of the first and second embodiments has been described with reference to the sustain pulse and the priming pulse serving as driving pulses, a driving method corresponding to the aforementioned driving method is also applicable to an erase pulse having another mode, for example, so far as this driving pulse is applied to a plurality of electrodes in common.

It is understood that the mode of division or connection of the PDP and the common drivers and the driving method are illustrated or expressed in the modes shown in FIGS. 2 to 6 and FIGS. 9 and 10.

Figure 14:
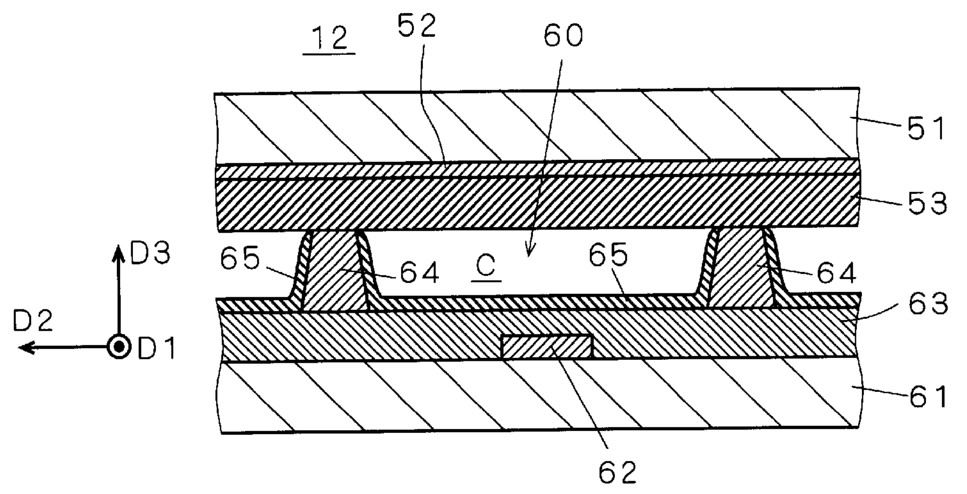
FIG. 14 is a longitudinal sectional view typically showing the structure of an opposite two-electrode alternating plasma display panel.

The aforementioned dividing and driving method are also applicable to an opposite two-electrode AC-PDP 12 appearing in FIG. 14 showing a longitudinal section of its discharge cell C in place of the three-electrode AC-PDP 11. As shown in FIG. 14, the opposite two-electrode AC-PDP 12 has glass substrates 51 and 61 arranged in parallel through a discharge space 60 filled with discharge gas such as Ne—Xe mixed gas. The glass substrate 51 comprises a plurality of strip-shaped electrodes (second or first electrodes) 52 (FIG. 14 shows only one electrode in relation to the direction thereof) formed on a surface closer to the discharge space 60 in the form of stripes along a second direction D2 perpendicular to a third direction D3 perpendicular to the surface and a dielectric layer 53 formed to cover the electrodes 52 and the aforementioned surface of the glass substrate 51.

On the other hand, the glass substrate 61 comprises a plurality of strip-shaped electrodes (first or second electrodes) 62 (FIG. 14 shows only one electrode in relation to the illustrated range) formed on a surface closer to the discharge space 60 in the form of stripes along a first direction D1 perpendicular to the aforementioned second and third directions D2 and D3, a dielectric layer 63 formed to cover the electrodes 62 and the aforementioned surface of the glass substrate 61, a strip-shaped barrier rib 64 formed on a surface of the dielectric layer 63 closer to the discharge space 60 in each area corresponding to that between each adjacent electrodes 52 along the first direction D1, and a fluorescent substance layer 65 formed on the inner surface of a U-shaped groove formed by the aforementioned surface of the dielectric layer 63 and opposite side wall surfaces of adjacent barrier ribs 64.

The opposite two-electrode AC-PDP may have (a) a structure having no fluorescent substance layer 65, (b) a structure having a protective film consisting of a high secondary electronic material such as MgO formed on (in the vicinity of at least a projected part of the electrode 62 of) the surface of the fluorescent substance layer 65 closer to the discharge space 60 and the surface of the dielectric layer 53 closer to the discharge space 60, or (c) a structure having the aforementioned protective film on the aforementioned surface of the dielectric layer 53 and a protective film which is substituted for the fluorescent substance layer 65 close to the projected part of the electrode 62.

Figure 15:
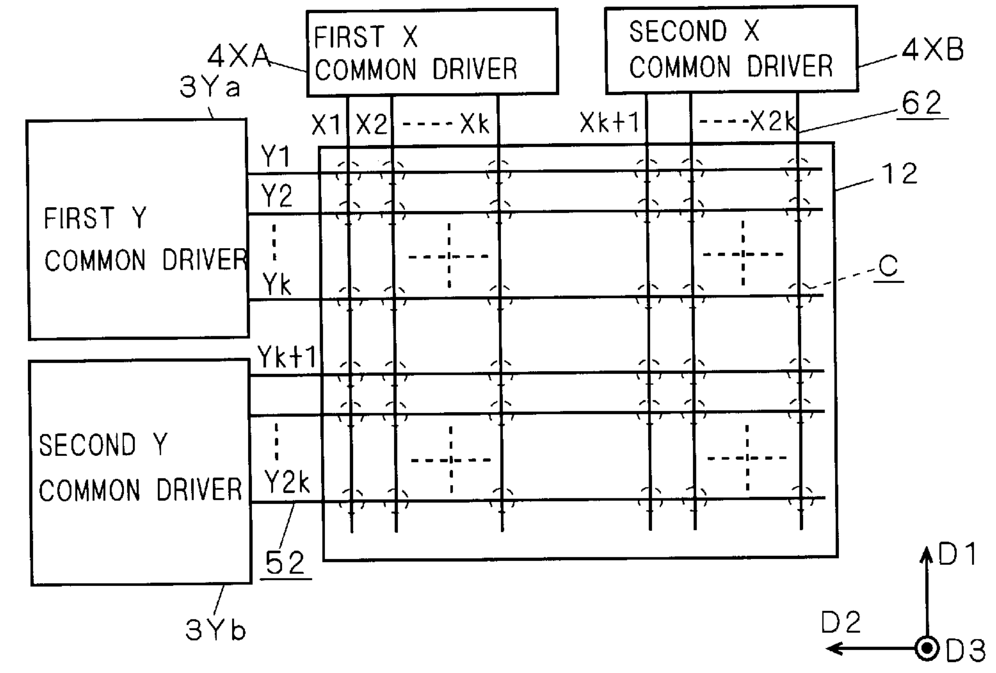
FIG. 15 is a model diagram showing third connection between row electrodes, column electrodes and common drivers according to the third embodiment with respect to a plasma display device having the opposite two-electrode alternating plasma display panel.
Figure 16:
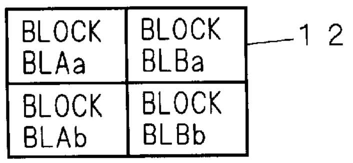
FIG. 16 is a model diagram showing fourth connection between the sustain electrodes, the scan electrodes and the common drivers in the plasma display device according to the third embodiment.

FIG. 15 is a schematic diagram showing a structure in the case of applying the PDP 12 having the structure shown in FIG. 14 to a plasma display device. FIG. 15 illustrates N (=2k) electrodes 52 as row electrodes Y1 to **Y2*k* and N (=2k) electrodes 62 as column electrodes X1 to N2*k*. For convenience of description, the row electrodes and the column electrodes are denoted by the same reference numerals as those for the aforementioned sustain electrodes and scan electrodes. For example, the row electrodes Y1 to Yk are connected to a first Y common driver 3Y*a* and the row electrodes Yk to Y2*k* are connected to a second Y common driver 3Y*b* while the column electrodes X1 to Xk are connected to a first X common driver 4XA and the column electrodes Xk to X2*k* are connected to a second X common driver 4XB with respect to the opposite two-electrode AC-PDP 12, as shown in FIG. 15. According to the mode of division or connection for the electrodes and the common drivers shown in FIG. 15, each of the aforementioned four blocks BLAa (first discharge cell group), BLAb (second discharge cell group), BLBa (third discharge cell group) and BLBb (fourth discharge cell group) corresponds to each block shown in FIG. 16. The plasma display device having the schematic structure of FIG. 15** can be driven by applying the basic principle of the driving method according to each of the first and second embodiments.

Each of the aforementioned first to third embodiments has been described with reference to the driving method of combining the X common driver and the Y common driver each divided into two parts in the form of a matrix thereby generating discharge in the PDP between 2×2=4 blocks corresponding to the aforementioned combination out of phase. However, the number of division of the common drivers or the pairs of electrodes of the PDP is not restricted to two. Alternatively, the X common driver may be divided into s parts and the Y common driver may be divided into t parts, and pairs of electrodes (or a screen) of the PDP is divided into the s by t blocks (or groups) combined in the form of a matrix. At this time, the outputs of the common drivers are rendered out of phase so that discharge is generated in only one of a plurality of blocks connected to each of the divided common drivers when the voltage is supplied to each block. Such a driving method can reduce substantial peak currents flowing in X and Y common drivers to 1/t and to 1/s respectively. Consequently, the aforementioned effects (i) to (v) can be attained.

Fourth Embodiment

Figure 9:
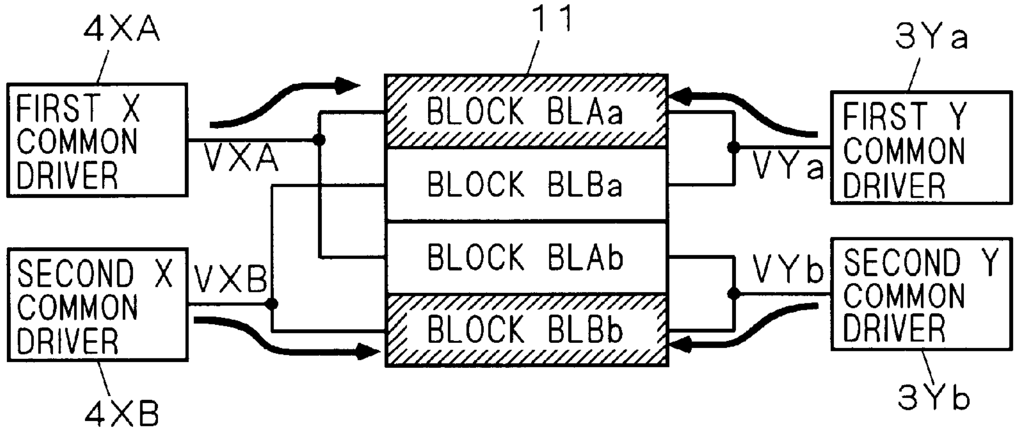
FIGS. 9 and 10 are model diagrams for illustrating a driving method in a plasma display device according to a second embodiment of the present invention.
Figure 10:
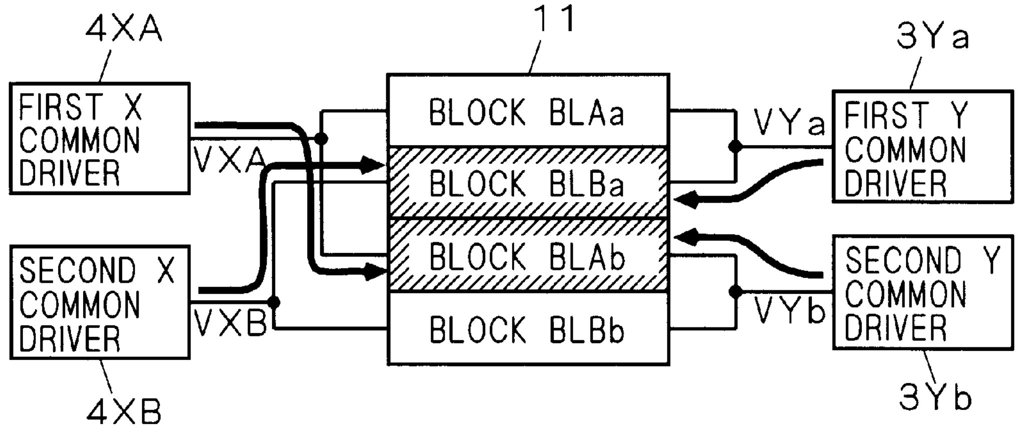

The second embodiment has been described with reference to the driving method alternately executing discharge in the blocks BLAa and BLBb and discharge in the blocks BLBa and BLAb with respect to the four blocks BLAa, BLAb, BLBa and BLBb as shown in FIGS. 9 and 10. With reference to a fourth embodiment of the present invention, an interlace operation implemented by applying this driving method is described in detail. The following description is made on the case where two blocks simultaneously dischargeable among four divided blocks are allocated to odd rows in display lines of a PDP while the remaining two blocks are allocated to even rows of the display lines while dividing fields for performing interlace display.

Figure 17:
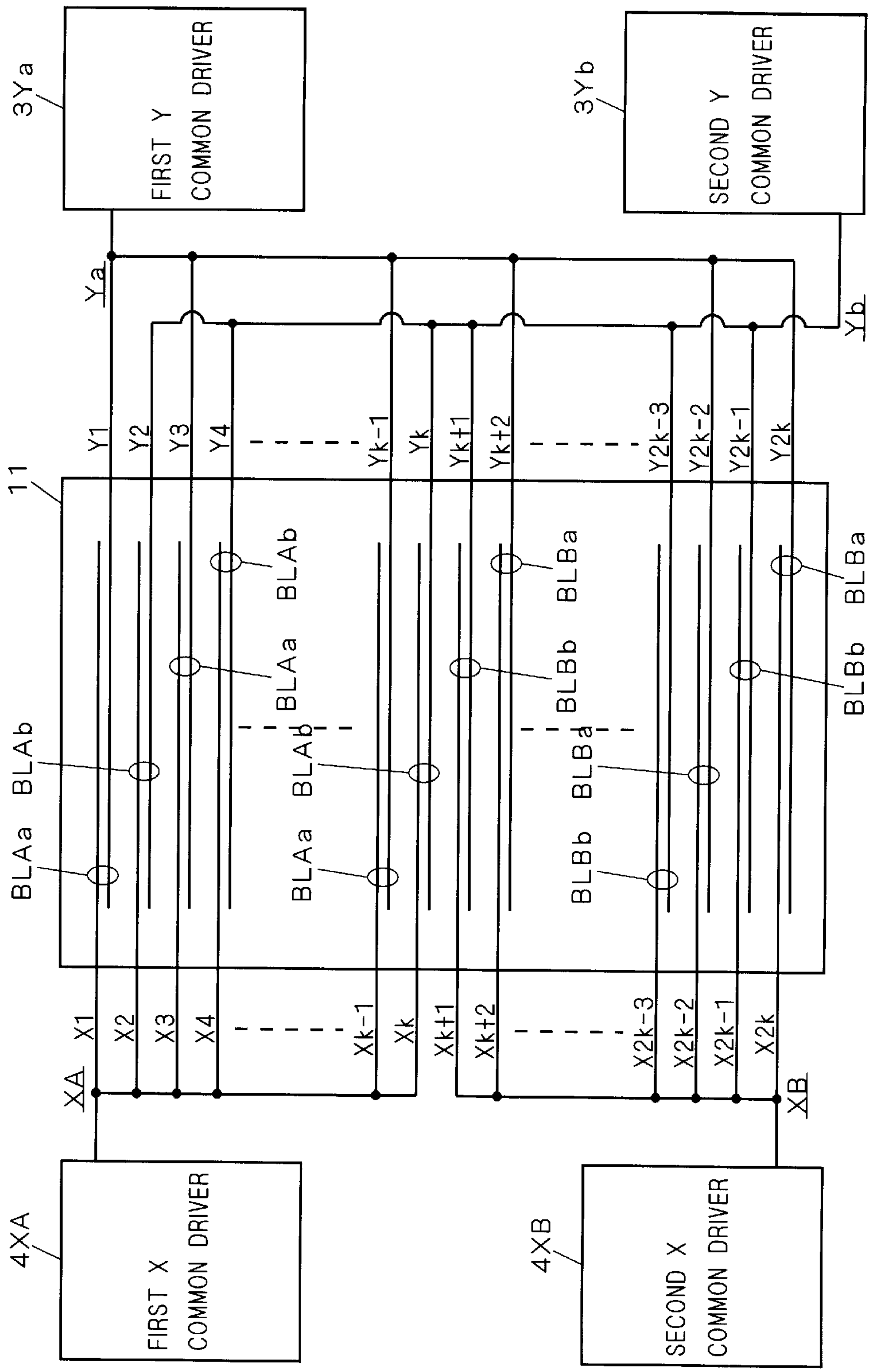
FIG. 17 is a model diagram showing first connection between sustain electrodes, scan electrodes and common drivers in a plasma display device according to a fourth embodiment of the present invention.

FIG. 17 is a schematic diagram showing the structure of a plasma display device according to the fourth embodiment. Referring to FIG. 17, the point that only parts necessary for the following description are extracted from FIG. 1 and illustrated and the point that illustration of a scan driver 2 is omitted, similarly to the first to third embodiments.

In the plasma display device according to the fourth embodiment, as shown in FIG. 17, ① scan electrodes (forming a first Y electrode group Ya) forming odd-row display lines and even-row display lines in the upper and lower half surfaces of the PDP respectively are connected to a first common driver **3Y*a* among N (=2k) scan electrodes Y1 to Y2*k*,**

② scan electrodes (forming a second Y electrode group Yb) forming even-row display lines and odd-row display lines in the upper and lower half surfaces of the PDP respectively are connected to a second Y common driver **3Y*b*. On the other hand, ③ sustain electrodes X1 to Xk** (forming a first X electrode group XA) of display lines belonging to the upper half surface of the PDP is connected to a first X common driver 4XA among N (=2k) sustain electrodes X1 to XN, and ④ the sustain electrodes Xk+1 to X2*k* (forming a second X electrode group XB) of display lines belonging to the lower half surface of the PDP are connected to a second X common driver 4XB.

According to this connection mode, blocks BLAa and BLBb are distributed to the odd-row display lines on the overall surface of the PDP, and blocks BLAb and BLBa are distributed to the even-row display lines. While the connection mode shown in FIG. 17 is similar to the aforementioned connection mode shown in FIG. 12 in the point that a plurality of sustain electrodes (cf., a plurality of scan electrodes in FIG. 12) are divided into the upper and lower half surfaces, the connection mode of a plurality of scan electrodes (cf., a plurality of sustain electrodes in FIG. 12) is different. While these electrodes are divided into the even rows, the odd rows and the respective display lines in the overall surface of the PDP in the connection mode shown in FIG. 12, the same are divided into two parts (four parts as viewed from the connection mode of the common drivers), i.e., the odd-row and even-row display lines in the upper and lower half surfaces and the even-row and odd-row display lines in the upper and lower half surfaces respectively in the connection mode shown in FIG. 17, as described with reference to the aforementioned items ① and ②.

The PDP having electrode pair groups BLAa, BLAb, BLBa and BLBb divided in the aforementioned manner is driven while dividing one frame period into (i) an odd field executing discharge in the blocks BLAa and BLBb and (ii) an even field executing discharge in the blocks BLBa and BLAb.

Figure 18:
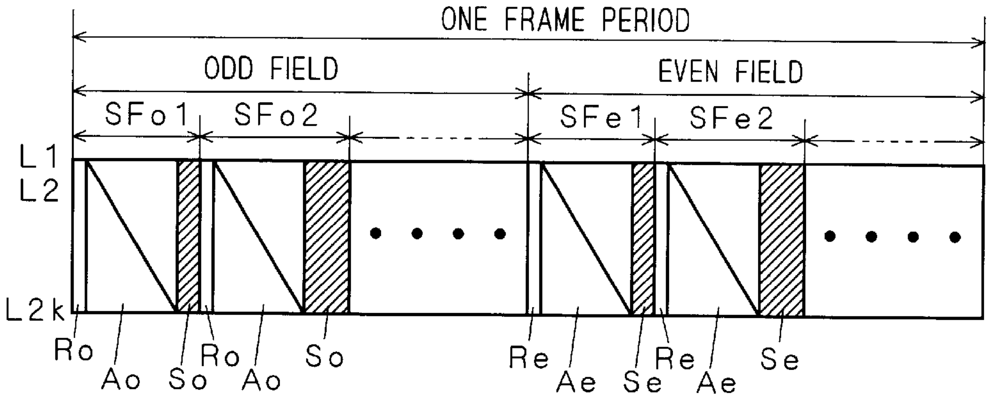
FIG. 18 illustrates the structure of subfields in a subfield gradation method in a driving method according to the fourth embodiment of the present invention.

FIG. 18 shows a subfield structure in the case of executing the aforementioned driving method by a subfield gradation method. As shown in FIG. 18, one frame period is divided into an odd field and an even field, as described above. The odd field is further divided into a plurality of subfield periods formed by a reset period Ro, an address period Ao and a sustain period So respectively. Similarly, the even field is further divided into a plurality of subfield periods formed by a reset period Re, an address period Ae and a sustain period Se respectively.

A scan pulse is sequentially applied to only odd-row display lines L2*i*+1 (i: integer of at least zero) in the address period Ao of the odd field and only to even-row display lines L2*i* in the address period Ae of the even field. At this time, it follows to that every alternate display line of the PDP is scanned.

Figure 19:
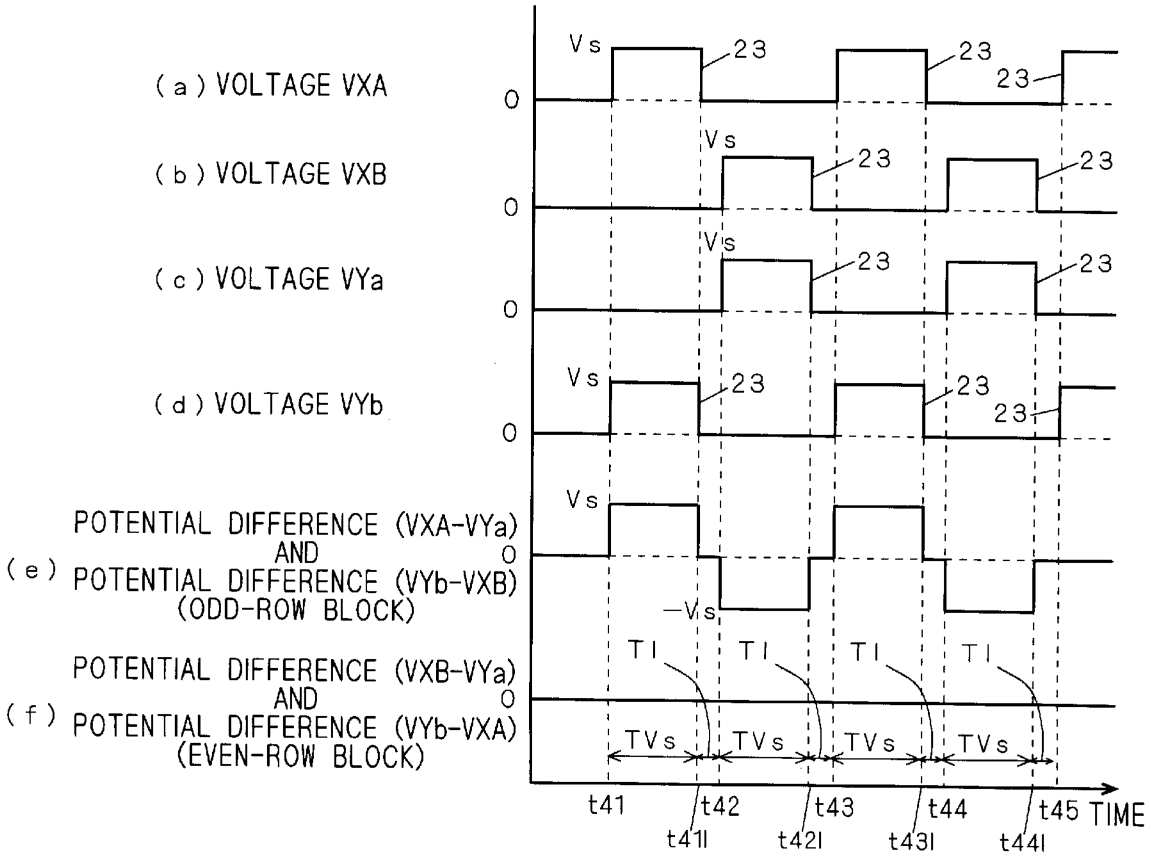
FIG. 19 is a timing chart showing driving waveforms in an odd field sustain period in the driving method according to the fourth embodiment.

In the sustain period and the reset period characterizing the driving method according to the fourth embodiment, the PDP is driven as follows:

FIG. 19 is a timing chart showing respective driving waveforms in the sustain period So of the odd field. Referring to FIG. 19, (*a*) to (*d*) show the waveforms of voltages VXA, VXB, VYa and VYb respectively. Further, (e) in FIG. 19 shows the voltage waveform of potential differences (VXA−VYa) and (VYb−VXB), i.e., (external) voltages supplied to discharge cells belonging to the odd-row display lines or odd-row blocks. Similarly, (f) in FIG. 19 shows the voltage waveform of potential differences (VXB−VYa) and (VYb−VXA), i.e., (external) voltages supplied to discharge cells belonging to the even-row display lines or even-row blocks.

As shown at (a) to (d) in FIG. 19, the voltages VXA and VYb have the same pulse waveforms and the voltages VXB and VYa have the same pulse waveforms in the sustain period So of the odd field. Further, the pulse waveforms of the voltages VXA and VYb and the voltages VXB and VYa are 180 degrees out of phase with each other.

As shown in FIG. 19, therefore, when the voltages VXA and VYb change from a voltage value 0 to a voltage value Vs (sustain pulse 23) at a time t41, the potential differences (VXA−VYa) and (VYb−VXB) change from the voltage value 0 to the voltage value Vs, thereby generating sustain discharge in the odd-row display lines. At this time, the voltages VXB and VYa are at the voltage value 0 and hence the potential differences (VXB−VYa) and (VYb−VXA) are at the voltage value 0, whereby no sustain discharge is generated in the even-row display lines.

When the voltages VXB and VYa thereafter change from the voltage value 0 to the voltage value Vs at a time t42, the potential differences (VXA−VYa) and (VYb−VXB) change from the voltage value 0 to a voltage value (−Vs), thereby generating sustain discharge in the odd-row display lines. The voltages VXA and VYb are at the voltage value 0, and hence no sustain discharge is generated in the even-row display lines.

In the sustain period So of the odd field, sustain discharge is generated in the odd-row blocks supplied with voltages inverted in polarity (changing in an alternate manner). On the other hand, the even-row blocks are supplied with no voltage in the sustain period So, to generate no sustain discharge.

Figure 20:
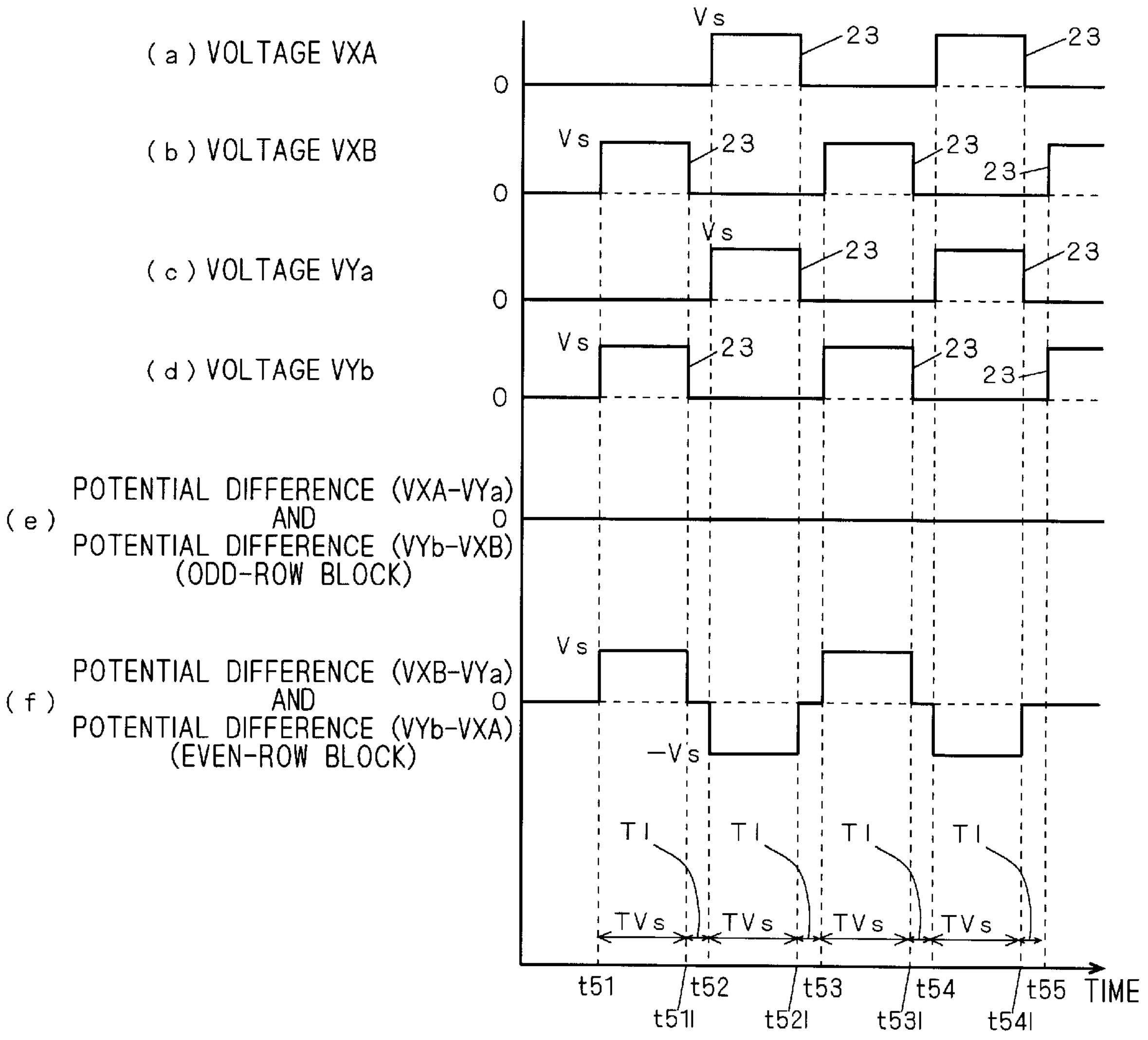
FIG. 20 is a timing chart showing driving waveforms in an even field sustain period in the driving method according to the fourth embodiment.

A driving method in the sustain period Se of the even field is described with reference to FIG. 20. FIG. 20 is a timing chart showing respective driving waveforms in the sustain period Se of the even field, and corresponds to FIG. 19. Referring to FIG. 20, (*a*) to (*f*) are similar to (a) to (f) in FIG. 19 respectively.

As shown at (a) to (d) in FIG. 20, the voltages VXA and VYa have the same pulse waveforms and the voltages VXB and VYb have the same waveforms in the sustain period Se of the even field. Further, the pulse waveforms of the voltages VXA and VYa and the voltages VXB and VYb are 180 degrees out of phase with each other.

When the voltages VXB and VYb change from the voltage value 0 to the voltage value Vs (sustain pulse 23) at a time t51, therefore, the voltage Vs is supplied to the even-row blocks (see (f) in FIG. 20), thereby generating sustain discharge in the even-row display lines. At this time, the voltages VXA and VYa are at the voltage value 0 and the odd-row blocks are supplied with no voltage (see (e) in FIG. 20), whereby no sustain discharge is generated in the odd-row display lines.

When the voltages VXA and VYa thereafter change from the voltage value 0 to the voltage value Vs at a time t52, the voltage value (−Vs) is supplied to the even-row blocks as a pulse out of phase with that at the time t51 (see (f) in FIG. 20), thereby generating sustain discharge in the even-row display lines. The voltages VXB and VYb are supplied with no voltage at this time, and hence no sustain discharge is generated in the odd-row display lines (see (e) in FIG. 20).

In the sustain period Se of the even field, sustain discharge is generated in the even-row blocks supplied with the alternatingly changing voltage, while no sustain discharge is generated in the odd-row blocks.

Thus, no discharge is simultaneously generated in the blocks BLAa and BLBb forming the odd-row blocks and the blocks BLAb and BLBa forming the even-row blocks. Therefore, it is possible to provide a driving method optimum for an interlace signal for a TV image or the like resulting from the fact that interlace display is possible while attaining the aforementioned effect of reducing the peak current.

Further, the sustain pulse is substantially applied to only the rows performing sustain discharge although sustain discharge is performed every other row, whereby the number of times for applying the sustain pulse may not be increased with respect to the conventional driving method. Therefore, reactive power resulting from increase of the number of applied pulses is not increased.

According to the pulse waveforms shown at (a) to (d) in FIGS. 19 and 20, the length of a halt period TI of the driving pulses applied to the blocks BLAa, BLAb, BLBa and BLBb can be arbitrarily set as compared with the driving method shown in the timing chart of FIG. 11. While the duty ratio of the driving pulses applied to the blocks BLAa, BLAb, BLBa and BLBb is limited to 50% in the case of the pulse waveforms shown at (a) to (d) in FIG. 11 as shown at (e) to (f) in FIG. 11, the duty ratio of the driving pulses can be arbitrarily set according to the pulse waveforms shown at (a) to (d) in FIGS. 19 and 20. In other words, the halt period TI of the driving pulses can be arbitrarily set. Therefore, each of the driving methods shown in FIGS. 19 and 20 has such an advantage that the degree of freedom of the driving method can be improved in the sustain period. For example, it is possible to apply a driving method (proposed in Japanese Patent Laying-Open Gazette No. 11-109914 (1999), for example) positively utilizing spatial charges generated by discharge on the leading edge of the sustain pulse supplied to the respective blocks and discharge (self erase discharge) on the trailing edge for continuing sustain discharge, for example.

The driving method according to each of the timing charts shown in FIGS. 19 and 20 is also applicable to the reset periods Ro and Re in the odd and even fields.

Figure 21:
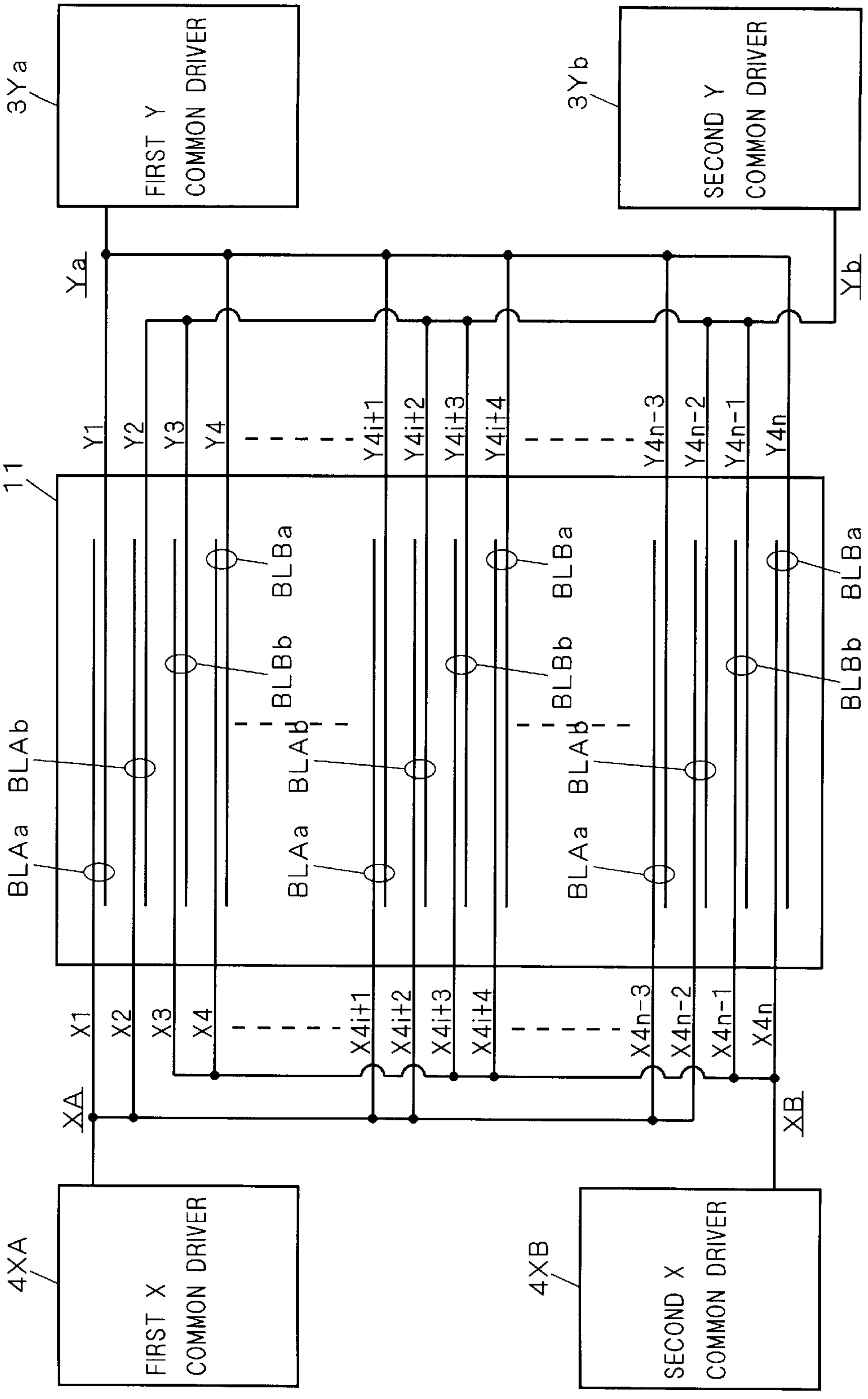
FIG. 21 is a model diagram showing second connection between the sustain electrodes, the scan electrodes and the common drivers in a plasma display device according to the fourth embodiment.

FIG. 21 shows another mode related to division of the odd-row blocks and the even-row blocks. As shown in FIG. 21, four pairs of electrodes or four rows of display lines are grasped as a set for connecting the respective sets to common drivers 4XA, 4XB, 3Y*a* and 3Y*b* in descending order of blocks BLAa, BLAb, BLBb and BLBa. In more detail, assuming that i represents an integer of at least zero, ① sustain electrodes X4*i*+1 and X4*i*+2 are connected to a first X common driver 4XA while a scan electrode Y4*i*+1 is connected to a first Y common driver 3Y*a* and a scan electrode Y4*i*+2 is connected to a second Y common driver 3Y*b*. On the other hand, ② sustain electrodes X4*i*+3 and X4*i*+4 are connected to a second X common driver 4XB while a scan electrode Y4*i*+3 is connected to the second Y common driver 3Y*b* and a scan electrode Y4*i*+4 is connected to the first Y common driver 3Y*a*.

Also according to this connection method, it is possible to allocate the simultaneously dischargeable blocks BLAa and BLBb to the odd-row display lines while allocating the blocks BLAb and BLBa to the even-row display lines. Thus, the aforementioned driving method is similarly applicable. At this time, the following priority is attained with respect to the connection mode shown in FIG. 17: In the connection mode shown in FIG. 17, the two blocks connected to the first and second X common drivers 4XA and 4XB have the boundary at the center of the screen of the PDP, and hence such a boundary part may be conspicuous when a brightness difference is caused between the blocks due to different loads applied thereto or the like. According to the connection mode shown in FIG. 21, on the other hand, not only the two blocks connected to the first and second X common drivers 4XA and 4XB but also the four blocks BLAa, BLAb, BLBa and BLBb are divided and dispersed along the overall PDP, whereby the boundaries therebetween are inconspicuous also when brightness differences are caused between the blocks.

Line flicker or image inconvenience readily generated when displaying a motion picture can be removed by setting one frame period in FIG. 18, i.e., one frame period on display emission forming image display (a) to one field period (about 1/60 sec. in an NTSC-TV signal, for example) in a TV signal or an image input signal from a personal computer or (b) shorter (about 1/50 sec. or less, for example) than a critical fusion cycle in visual characteristics asynchronously with the field period of the input signal, so that excellent image display can be attained.

The plasma display device and the driving method according to each of the first to fourth embodiments are also applicable to a plasma display device having a DC-PDP.

While the invention has been shown and described in detail, the foregoing description is in all aspects illustrative and not restrictive. It is therefore understood that numerous modifications and variations can be devised without departing from the scope of the invention.

What is claimed is:

1. A method of driving a plasma display panel comprising a plurality of first electrodes arranged in parallel with each other and a plurality of second electrodes each pairing with one of said first electrodes for forming prescribed discharge in a discharge space between each pair of electrodes formed by one of said first electrodes and one of said second electrodes, wherein the plurality of pairs of electrodes are divided into (s×t (s and t: integer of at least 2)) electrode pair groups, said plurality of first electrodes being divided into s first electrode groups and said plurality of second electrodes being divided into t second electrode groups, and said method generates said prescribed discharge in said (s×t) electrode pair groups in units of said electrode pair groups at staggered timing.

2. The method of driving a plasma display panel according to claim 1, wherein said prescribed discharge in said (s×t) electrode pair groups is generated without simultaneously generating discharge in a plurality of said first electrode groups among said s first electrode groups and without simultaneously generating discharge in a plurality of said second electrode groups among said t second electrode groups.

3. The method of driving a plasma display panel according to claim 1, wherein said plurality of first electrodes are divided into two said first electrode groups and said plurality of second electrodes are divided into two said second electrode groups, and said plurality of electrode pair groups are divided into:

a first electrode pair group formed by one of said first electrode groups and one of said second electrode groups, a second electrode pair group formed by said one of said first electrode groups and the other of said second electrode groups, a third electrode pair group formed by the other of said first electrode groups and said one of said second electrode groups, and a fourth electrode pair group formed by said other of said first electrode groups and said other of said second electrode groups, said method comprising steps of:

simultaneously generating said prescribed discharge in said first electrode pair group and said fourth electrode pair group, and simultaneously generating said prescribed discharge in said second electrode pair group and said third electrode pair group.

4. The method of driving a plasma display panel according to claim 3, wherein said first electrodes and said second electrodes are arranged in parallel with each other, and either said one of said first electrode groups or said one of said second electrode groups forms one of electrodes in any odd or even said pairs of electrodes among said plurality of pairs of electrodes arranged in parallel with each other.

5. The method of driving a plasma display panel according to claim 4, wherein one frame period for image display is divided into a period generating discharge in said odd said pairs of electrodes and a period generating discharge in said even said pairs of electrodes.

6. The method of driving a plasma display panel according to claim 1, wherein an image display time for one screen is divided into a plurality of subfields and then priming discharge, erase discharge, write discharge based on input image data and sustain discharge are generated in said discharge space in each of said plurality of subfields, and wherein said prescribed discharge is at least one of said priming discharge, said erase discharge and said sustain discharge.

7. A method of driving a plasma display panel comprising a plurality of first electrodes arranged in parallel with each other and a plurality of second electrodes arranged in a direction three-dimensionally intersecting with said plurality of first electrodes through a discharge space for forming prescribed discharge in each discharge cell formed at a three-dimensional intersection of a first electrode and a second electrode, wherein said plurality of first electrodes are divided into two first electrode groups and said plurality of second electrodes are divided into two second electrode groups, and a plurality of said discharge cells are divided into:

a first discharge cell group formed on said three-dimensional intersection between one of said first electrode groups and one of said second electrode groups, a second discharge cell group formed on said three-dimensional intersection between said one of said first electrode groups and the other of said second electrode groups, a third discharge cell group formed on said three-dimensional intersection between the other of said first electrode groups and said one of said second electrode groups, and a fourth discharge cell group formed on said three-dimensional intersection between said other of said first electrode groups and said other of said second electrode groups, said method comprising steps of:

simultaneously generating said prescribed discharge in said first discharge cell group and said fourth discharge cell group; and simultaneously generating said prescribed discharge in said second discharge cell group and said third discharge cell group.

8. The method of driving a plasma display panel according to claim 6, wherein an image display time for one screen is divided into a plurality of subfields and then priming discharge, erase discharge, write discharge based on input image data and sustain discharge are generated in said discharge space in each of said plurality of subfields, and wherein said prescribed discharge is at least one of said priming discharge, said erase discharge and said sustain discharge.

9. A plasma display device comprising:

a plasma display panel including a plurality of first electrodes arranged in parallel with each other and a plurality of second electrodes each pairing with one of said first electrodes for forming prescribed discharge in a discharge space between each pair of electrodes formed by one of said first electrodes and one of said second electrodes; and a driving device connected to said plurality of first electrodes and said plurality of second electrodes for supplying a driving voltage to each first electrode and each second electrode, wherein the plurality of pairs of electrodes are divided into (s×t (s and t: integer of at least 2)) electrode pair groups, said plurality of first electrodes being divided into s first electrode groups and said plurality of second electrodes being divided into t second electrode groups, and said driving device generates and outputs said driving voltage generating each said prescribed discharge in each of said (s×t) electrode pair groups in units of said electrode pair groups at staggered timing.

10. The plasma display device according to claim 9, wherein said driving unit generates and outputs said driving voltage generating said prescribed discharge in each of said (s×t) electrode pair groups without simultaneously generating discharge in a plurality of said first electrode groups among said s first electrode groups and without simultaneously generating discharge in a plurality of said second electrode groups among said t second electrode groups.

11. The plasma display device according to claim 9, wherein said plurality of first electrodes are divided into two said first electrode groups and said plurality of second electrodes are divided into two said second electrode groups, and said plurality of electrode pair groups are divided into:

a first electrode pair group formed by one of said first electrode groups and one of said second electrode groups, a second electrode pair group formed by said one of said first electrode groups and the other of said second electrode groups, a third electrode pair group formed by the other of said first electrode groups and said one of said second electrode groups, and a fourth electrode pair group formed by said other of said first electrode groups and said other of said second electrode groups, and said driving device generates and outputs said driving voltage simultaneously generating said prescribed discharge in said first electrode pair group and said fourth electrode pair group, and generates and outputs said driving voltage simultaneously generating said prescribed discharge in said second electrode pair group and said third electrode pair group.

12. The plasma display device according to claim 11, wherein said first electrodes and said second electrodes are arranged in parallel with each other, and either said one of said first electrode groups or said one of said second electrode groups forms one of electrodes in any odd or even said pairs of electrodes among said plurality of pairs of electrodes arranged in parallel with each other.

13. The plasma display device according to claim 12, wherein said driving device divides one frame period for image display into a period generating discharge in said odd said pairs of electrodes and a period generating discharge in said even pairs of electrodes and then generates and outputs said driving voltage.

14. The plasma display device according to claim 9, wherein when said driving device divides an image display time for one screen into a plurality of subfields and then generates and outputs said driving voltage for generating priming discharge, erase discharge, write discharge based on input image data and sustain discharge in said discharge space in each of said plurality of subfields, said prescribed discharge is at least one of said priming discharge, said erase discharge and said sustain discharge.

15. A plasma display device comprising:

a plasma display panel including:

a plurality of first electrodes divided into s (s: an integer of at least 2) first electrode groups; and a plurality of second electrodes divided into t (t: an integer of at least 2) second electrode groups, each second electrode being paired with a first electrode so that said plurality of first electrodes and said plurality of second electrodes form a plurality of electrode pairs, each electrode pair being associated with a discharge cell of said display panel, said plurality of electrode pairs being divided into (s×t) electrode pair groups;

a driving device selectively supplying a driving voltage to said plurality of first electrodes and said plurality of second electrodes to cause a prescribed discharge in discharge cells of said display panel; and a means for arbitrarily setting a duty ratio of each driving pulse in supplying said driving voltage.

16. A plasma display device comprising:

a plasma display panel including:

a plurality of first electrodes divided into s (s: an integer of at least 2) first electrode groups; and a plurality of second electrodes divided into t (t: an integer of at least 2) second electrode groups, each second electrode being paired with a first electrode so that said plurality of first electrodes and said plurality of second electrodes form a plurality of electrode pairs, each electrode pair being associated with a discharge cell of said display panel, said plurality of electrode pairs being divided into (s×t) electrode pair groups; and a driving device selectively supplying a driving voltage to said plurality of first electrodes and said plurality of second electrodes to cause a prescribed discharge in discharge cells of said display panel, said driving device including:

a first electrode driver operatively connected to the first electrodes of a plurality of said electrode pair groups; and a second electrode driver operatively connected to the second electrodes of a plurality of said electrode pair groups, wherein, in the case that the prescribed discharge is sustain discharge, during the sustain period, said first electrode driver supplies said driving voltage in a different waveform to each of said s first electrode groups, and said second electrode driver supplies said driving voltage in a different waveform to each of said t second electrode groups.

17. A method of driving a plasma display panel comprising a plurality of first electrodes divided into 2 first electrode groups and a plurality of second electrodes divided into 2 second electrode groups, said method comprising selectively supplying a driving voltage to said plurality of first electrodes and said plurality of second electrodes in the following waveform that:

(1) pulses applied to one of said first electrode groups and the other of said first electrode groups are out of phase with each other, (2) pulses applied to one of said second electrode groups and the other of said second electrode groups are out of phase with each other, and (3) pulses applied to said one of said first electrode groups and said one of said second electrode groups are 90 degrees out of phase with each other.

* * * * *